US006562266B2

(12) United States Patent
Mickols

(10) Patent No.: US 6,562,266 B2
(45) Date of Patent: *May 13, 2003

(54) COMPOSITE MEMBRANE AND METHOD FOR MAKING THE SAME

(75) Inventor: William E. Mickols, Chanhassen, MN (US)

(73) Assignee: Dow Global Technologies Inc., Midland, MI (US)

(*) Notice: Subject to any disclaimer, the term of this patent is extended or adjusted under 35 U.S.C. 154(b) by 39 days.

This patent is subject to a terminal disclaimer.

(21) Appl. No.: 09/829,024

(22) Filed: Apr. 9, 2001

(65) Prior Publication Data

US 2001/0050252 A1 Dec. 13, 2001

Related U.S. Application Data

(63) Continuation-in-part of application No. 09/550,527, filed on Apr. 17, 2000, now Pat. No. 6,337,018.

(51) Int. Cl.[7] .............................. B29C 65/00; B05D 5/00
(52) U.S. Cl. ...................... 264/41; 264/48; 427/244; 427/245; 210/500.38
(58) Field of Search ..................... 210/500.38, 490; 264/41.48, 49; 427/244, 245

(56) References Cited

U.S. PATENT DOCUMENTS

| | | | |
|---|---|---|---|
| 2,648,696 A | 8/1953 | Whetstone | 260/461 |
| 3,619,424 A | 11/1971 | Blanchard et al. | 210/23 |
| 4,233,434 A | 11/1980 | Kraus et al. | 528/337 |
| 4,242,208 A | 12/1980 | Kawaguchi et al. | |
| 4,277,344 A | 7/1981 | Cadotte | 210/654 |
| 4,758,343 A | 7/1988 | Sasaki et al. | 210/500.28 |
| 4,765,897 A | 8/1988 | Cadotte et al. | 210/500.23 |
| 4,824,574 A | 4/1989 | Cadotte et al. | 210/654 |
| 4,889,636 A * | 12/1989 | Perry et al. | |
| 4,948,506 A * | 8/1990 | Londsdale et al. | |
| 4,950,404 A | 8/1990 | Chau | 210/500.27 |
| 4,983,291 A | 1/1991 | Chau et al. | 210/490 |
| 5,254,261 A | 10/1993 | Tomaschke et al. | 210/654 |
| 5,271,843 A | 12/1993 | Chau et al. | 210/654 |
| 5,614,099 A | 3/1997 | Hirose et al. | 210/653 |
| 5,733,602 A | 3/1998 | Hirose et al. | 427/245 |
| 5,755,964 A | 5/1998 | Mickols | 210/500.37 |
| 5,843,351 A | 12/1998 | Hirose et al. | 264/45.1 |
| 5,876,602 A | 3/1999 | Jons et al. | 210/500.38 |
| 5,989,426 A | 11/1999 | Hirose et al. | 210/500.38 |
| 6,024,873 A | 2/2000 | Hirose et al. | 210/500.38 |
| 6,337,018 B1 * | 1/2002 | Mickols | |

FOREIGN PATENT DOCUMENTS

| | | |
|---|---|---|
| DE | 1 950 594 | 4/1970 |
| EP | 0 474 370 A1 | 3/1992 |
| JP | 271847-1988 | 10/1988 |
| JP | 10 235173 | 9/2001 |

OTHER PUBLICATIONS

"Composite Membrane and Method for Making the Same", William E. Mickols, U.S. Ser. No. 09/550,527, filed Apr. 17, 2000.
PCT International Search Report corresponding to application No. PCT/US01/11265.
Corbridge, D.E.C., *Studies in Inorganic Chemistry 6, Phosphorus, An Outline of its Chemistry, Biochemistry and Technology* (Third Edition), Elsevier, "Phosphorus—Carbon Compounds", Chapter 4, pp. 209–212, 1985.
Derwent Abstract, JP2000015067A, Manufacture of Composite Semipermeable Membrane for Recovery of Electrode Deposition Paints and Pure Water for Washing Semiconductor, etc. with available selected translated excerpts from patent.

* cited by examiner

*Primary Examiner*—Ana Fortuna

(57) ABSTRACT

A composite membrane and method for making the same, comprising a porous support and a polyamide surface. The subject membrane provides improved flux and/or rejection rates. The subject membrane is further capable of operating at lower operating pressures. The subject method includes reacting a polyfunctional amine with a polyfunctional acyl halide to form a polyamide. The method includes the step of contacting a complexing agent with the polyfunctional acyl halide prior substantial reaction between the polyfunctional acyl halide and a polyfunctional amine. The subject process is easily adapted to commercial scale manufacturing processes and is particularly suited for making nanofiltration and reverse osmosis composite membranes.

26 Claims, No Drawings

COMPOSITE MEMBRANE AND METHOD FOR MAKING THE SAME

This application is a continuation-in-part of prior application Ser. No. 09/550,527 filed Apr. 17, 2000 which issued on Jan. 8, 2002 as U.S. Pat. No. 6,337,018 and which is incorporated herein in its entirety and is relied upon for priority. Reference is further made to co-pending with U.S. Ser. No. 10/005,455 filed Nov. 2, 2001 which is a continuation of U.S. Pat. No. 6,337,018.

BACKGROUND OF THE INVENTION

Reverse osmosis and nanofiltration membranes are used to separate dissolved or dispersed materials from feed streams. The separation process typically involves bringing an aqueous feed solution into contact with one surface of the membrane under pressure so as to effect permeation of the aqueous phase through the membrane while permeation of the dissolved or dispersed materials is prevented.

Both reverse osmosis and nanofiltration membranes typically include a thin film discriminating layer fixed to a porous support, collectively referred to as a "composite membrane". Ultrafiltration and microfiltration membranes may also have a composite arrangement. The support provides physical strength but offers little resistance to flow due to its porosity. On the other hand, the discriminating layer is less porous and provides the primary means of separation of dissolved or dispersed materials. Therefore, it is generally the discriminating layer which determines a given membrane's "rejection rate"—the percentage of the particular dissolved material (i.e., solute) rejected, and "flux"—the flow rate per unit area at which the solvent passes through the membrane.

Reverse osmosis membranes and nanofiltration membranes vary from each other with respect to their degree of permeability to different ions and organic compounds. Reverse osmosis membranes are relatively impermeable to virtually all ions, including sodium and chlorine ions. Therefore, reverse osmosis membranes are widely used for the desalination of brackish water or seawater to provide relatively non-salty water for industrial, commercial, or domestic use because the rejection rate of sodium and chlorine ions for reverse osmosis membranes is usually from about 95 to about 100 percent.

Nanofiltration membranes are usually more specific for the rejection of ions. Generally, nanofiltration membranes reject divalent ions, including radium, magnesium, calcium, sulfate, and carbonate. In addition, nanofiltration membranes are generally impermeable to organic compounds having molecular weights above about 200 Daltons. Additionally, nanofiltration membranes generally have higher fluxes at comparable pressures than reverse osmosis membranes. These characteristics render nanofiltration membranes useful in such diverse applications as the "softening" of water and the removal of pesticides from water. As an example, nanofiltration membranes generally have a sodium chloride rejection rate of from about 0 to about 95 percent but have a relatively high rejection rate for salts such as magnesium sulfate and in some cases organic compounds such as atrazine.

Among particularly useful membranes for reverse osmosis and nanofiltration applications are those in which the discriminating layer is a polyamide. The polyamide discriminating layer for reverse osmosis membranes is often obtained by an interfacial polycondensation reaction between a polyfunctional amine monomer and a polyfunctional acyl halide monomer (also referred to as polyfuntional acid halide) as described in, for example, U.S. Pat. No. 4,277,344, which is incorporated herein by reference. The polyamide discriminating layer for nanofiltration membranes is typically obtained via an interfacial polymerization between a piperazine or an amine substituted piperidine or cyclohexane and a polyfunctional acyl halide as described in U.S. Pat. Nos. 4,769,148 and 4,859,384, both incorporated in their entirety by reference. Another way of obtaining polyamide discriminating layers suitable for nanofiltration is via the methods described in, for example, U.S. Pat. Nos. 4,765,897; 4,812,270; and 4,824,574. These patents describe changing a reverse osmosis membrane, such as those of U.S. Pat. No. 4,277,344, into a nanofiltration membrane.

Composite polyamide membranes are typically prepared by coating a porous support with a polyfunctional amine monomer, most commonly coated from an aqueous solution. Although water is a preferred solvent, non-aqueous solvents may be utilized, such as acetyl nitrile and dimethylformamide (DMF). A polyfunctional acyl halide monomer (also referred to as acid halide) is subsequently coated on the support, typically from an organic solution. Although no specific order of addition is necessarily required, the amine solution is typically coated first on the porous support followed by the acyl halide solution. Although one or both of the polyfunctional amine and acyl halide may be applied to the porous support from a solution, they may alternatively be applied by other means such as by vapor deposition, or neat.

Means for improving the performance of membranes by the addition of constituents to the amine and/or acyl halide solutions are described in the literature. For example, U.S. Pat. No. 4,950,404, issued to Chau, describes a method for increasing flux of a composite membrane by adding a polar aprotic solvent and an optional acid acceptor to the aqueous amine solution prior to interfacially polymerizing the amine with an polycarboxylic acid halide. Similarly, U.S. Pat. Nos. 6,024,873; 5,989,426; 5,843,351; 5,733,602; 5,614,099; and 5,576,057 to Hirose et al. describes the addition of selected alcohols, ethers, ketones, esters, halogenated hydrocarbons, nitrogen-containing compounds and sulfur-containing compounds having a solubility parameter of 8 to 14 $(cal/cm^3)^{1/2}$ to the aqueous amine solution and/or organic acid halide solution prior to interfacial polymerization.

Methods of improving membrane performance by post-treatment are also known. For example, U.S. Pat. No. 5,876,602 to Jons et al. describes treating a polyamide composite membrane with an aqueous chlorinating agent to improve flux, lower salt passage, and/or increase membrane stability to base. U.S. Pat. No. 5,755,964 to Mickols discloses a process wherein the polyamide discriminating layer is treated with ammonia or selected amines, e.g., butylamine, cyclohexylamine, and 1,6 hexane diamine. U.S. Pat. No. 4,765,897 to Cadotte discloses the post treatment of a membrane with a strong mineral acid followed by treatment with a rejection enhancing agent. U.S. Pat. Nos. 4,765,897; 5,876,602 and 5,755,964 are incorporated herein by reference.

Membranes having higher flux at standard operating pressures, or which are capable of maintaining flux at relatively lower operating pressures are desired. Moreover, membranes having higher rejection rates while achieving improved flux and/or lower pressure requirements are also desired. Methods for making such membranes, particularly those readily adaptable to commercial scale membrane fabrication are also desired.

SUMMARY OF THE INVENTION

The present invention provides an improved composite membrane and method for making the same by interfacially polymerizing a polyfunctional amine and a polyfunctional acyl halide on at least one surface of a porous support to form a polyamide layer thereon. The method is characterized by the step of contacting a complexing agent with the polyfunctional acyl halide prior to and/or during the reaction between the polyfunctional acyl halide and polyfunctional amine.

An object of the present invention is to provide improved membranes having higher flux and/or more preferred rejection characteristics (i.e. higher or lower depending upon the intended end use of the membrane). A further object of the present invention is to provide membranes capable of operating at relatively lower pressures while still providing a given flux and/or rejection. Still another object of the present invention is to provide methods for making such membranes, including methods which are readily adaptable to commercial scale membrane manufacturing. The subject method is particularly suited for making nanofiltration and reverse osmosis membranes.

DETAILED DESCRIPTION OF THE INVENTION

Composite membranes of the present invention are prepared by interfacially polymerizing a polyfunctional amine monomer (also referred to herein as "amine", "polyamine", and "polyfunctional amine"—wherein each term is intended to refer both to the use of a single species or multiple species of amines in combination) with a polyfunctional acyl halide (also referred to as "acyl halide", "acid halide", polyfunctional acid halide—wherein each term is intended to refer both to the use of a single species or multiple species of acyl halides in combination) on at least one surface of a porous support. The amine and acyl halide are typically delivered to the porous support by way of a coating step from solution wherein the amine is typically coated from an aqueous solution and the acyl halide is coated from a non-aqueous, organic-based solution. Although the coating steps can be "non-sequential" i.e. follow no specific order, the amine is preferably coated on the support first followed by the acyl halide. Coating may be accomplished by spraying, rolling, use of a dip tank, etc. Excess solution may be removed from the support by air and/or water knife, dryers, ovens, etc.

The polyfunctional amine monomer used in the present invention may have primary or secondary amino groups and may be aromatic (e.g., m-phenylenediamine, p-phenyenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of preferred amine species include primary aromatic amines having two or three amino groups, most especially m-phenylene diamine, and secondary aliphatic amines having two amino groups, most especially piperazine. The amine is typically applied to the microporous support as a solution in water. The aqueous solution most commonly contains from about 0.1 to about 20 weight percent and more preferably from about 0.5 to about 6 weight percent amine. Once coated on the microporous support, excess aqueous amine solution may be optionally removed. The amine solution need not be aqueous but is preferably immicible with the non-polar non-aqueous solvent described below.

As previously indicated, the monomeric polyfunctional acyl halide is preferably coated from a non-polar solvent, although the polyfunctional acyl halide may be delivered from a vapor phase (for polyfunctional acyl halides having sufficient vapor pressure). The polyfunctional acyl halides are preferably aromatic in nature and contain at least two and preferably three acyl halide groups per molecule. Because of their lower cost and greater availability, chlorides are generally preferred over the corresponding bromides or iodides. One preferred polyfunctional acyl halide is trimesoyl chloride (TMC). The polyfunctional acyl halide is typically dissolved in a non-polar organic solvent in a range of from 0.01 to 10.0 weight percent (more preferably 0.05 to 3 weight percent), and delivered as part of a continuous coating operation. Suitable non-polar solvents are those which are capable of dissolving polyfunctional acyl halides and which are immiscible with water. Preferred solvents include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C. such as $C_8$–$C_{14}$ hydrocarbons and mixtures thereof have more favorable flashpoints than their $C_5$–$C_7$ counterparts but they are less volatile.

Once brought into contact with one another, the polyfunctional acyl halide and polyfunctional amine react at their surface interface to form a polyamide discriminating layer. The reaction time is typically less than one second but contact time is often from one to sixty seconds, after which excess liquid may optionally be removed, e.g., by way of an air knife, water bath(s), dryer and the like. The removal of the excess water and/or organic solvent is most conveniently achieved by drying at elevated temperatures, e.g., from about 40° C. to about 120° C., although air drying at ambient temperatures may be used.

While not wishing to be bound by theory, it is believed that the acyl halide functional groups of the polyfunctional acyl halide monomer often become hydrolyzed prior to contact with amine functional groups. Under typical manufacturing conditions, such hydrolysis of acyl halide functional groups is substantially irreversible. That is, under the time, temperature and concentrations typically used in commercial scale membrane manufacturing, amine functional groups are not believed to substantially react with hydrolyzed acyl halide groups. It is believed that such hydrolysis of acyl halide groups leads to compromised membrane performance.

While not wishing to be bound by theory, it is believed that the subject complexing agents are capable of forming "associations" with the polyfunctional acyl halide monomers when utilized in accordance with the subject method. It is believed that the formation of such associations significantly reduce hydrolysis of the acyl halide functional groups and permits sufficient subsequent reaction between the acyl halide and amine functional groups thereby resulting in the aforementioned improvements in membrane performance.

The term "associations" is intended to describe the chemical interaction formed between the subject complexing agents and the polyfunctional acyl halide prior to or during the reaction of the amine and acyl halide functional groups. Such associations can also be described in terms of the elimination of repulsive forces between the polyfunctional acyl halide and other components of a solution.

Another way to describe the interaction between the acyl halide and complexing agent is in terms of the "change in total energy" resulting from their combination. In layman's terms, this is the change in energy resulting from the formation of associations between the complexing agent and acyl halide. In more formal terms, total energy "U" can be defined per Equation I:

$$U = TS - PV + \sum_{i=1}^{m} u_i * N_i$$

see for example H. Callan's "Thermodynamics", (John Wily & Son, New York, 1960). The change (Δ) in total energy "ΔU" resulting from the combination of distinct chemical species can be represented by Equation II:

$$\Delta U = \Delta T * S + T * \Delta S - \Delta P * V - P * \Delta V + \sum_{i=1}^{m} u_i * \Delta(N_i) + \sum_{i=1}^{m} \Delta(u_i) * N_i$$

where u is the chemical potential of each chemical species (e.g. TMC and the complexing agent), N is the number of moles of each chemical species, T is the Temperature, S is the entropy, P is the pressure, V is the volume of the system, i and m are integers starting with "one" where m represents the total number of chemical species within the system. The total energy is closely related to several other representations of energy that have experimental limitations. For example, free energy "$\mu$" is commonly used for reactions that occur at atmospheric pressure and can be represented by Equation III:

$$\mu = nG - TS - PV$$

where n equals the number of moles of the associated species (e.g. reaction product of the acyl halide monomer and complexing agent), G is the Gibbs free energy, T is the Temperature, S is the entropy, P is the pressure and V is the volume of the system. G can be defined according to Equation IV:

$$\Delta G = \Delta H - TS$$

where H is the enthalpy of the system. All references to energy and related terms and symbols are intended to be consistent with standard chemical convention.

When combined with acyl halide, the complexing agents of the subject invention preferably result in a change in total energy (ΔU) from about 3.5 to 20 kcals/mole, and more preferably from about 5 to 15 kcals/mole, and still more preferably of from 5 to 10 kcals/mole. Within the context of the present invention, the change in total energy resulting from the combination of the acyl halide and the complexing agent is approximately equal to the change in Gibbs free energy and enthalpy, i.e. U≈G≈H. Thus, one skilled in the art can typically determine the suitability of a given complexing agent for use with a particular acyl halide species by measuring the enthalpy (H) generated from their combination. Calorimetric methods for determining enthalpy of a system are well known.

For many embodiments, the total energy and/or enthalpy of the interaction of a given complexing agent and acyl halide is approximately equal to the total energy and/or enthalpy of the system used under manufacturing conditions. That is, the change in total energy or enthalpy of interaction between the acyl halide and complexing agent can be approximated by measuring the change in enthalpy of the system to which the complexing agent is added, e.g. the acyl halide coating solution including the acyl halide, solvent, additives, impurities, etc. For embodiments wherein the complexing agent is contacted with the acyl halide from the amine solution, the applicable "system" may be further complicated by additional chemical species, e.g. amine, water, etc. In the final analysis, it is the change in total energy resulting from the interaction between the acyl halide and complexing agent that is most relevant. With that said, it should be appreciated that the reaction medium can have a significant impact on the change in total free energy of the system. For example, in preferred embodiments the acyl halide and complexing agent are both substantially soluble in the solution from which they are coated.

Associations which are too weak (i.e. have a total energy value less about 3.5 kcals/mole) result in associations that do not effectively prevent hydrolysis of the acyl halide functional groups. As will be described below, one measure of a sufficiently strong association is the presence of a "detectable quantity" of "retained" complexing agent within the polyamide, even after post washing of the membrane. On the other hand, associations which are too strong (i.e. have a total energy of more than about 20 or preferably 15 kcals/mole) do not permit sufficient displacement and reaction by amines during membrane formation, thus preventing the formation of the desired polyamide. An example of an association which is too strong is the hydrolysis of an acid chloride group of TMC under common manufacturing conditions which results in a total energy value of greater than about 25 kcals/mole.

In order to provide the full benefit of the subject invention, it is believed that it is important to form the described association between the complexing agent and the acyl halide prior to or during the reaction between the acyl halide and amine. Thus, the timing and manner of addition of the complexing agent are believed to be important. For example, the benefit of the subject invention is not achieved by the sole addition of a phosphoric acid (e.g., as described in U.S. Pat. No. 4,765,897) after the acyl halide and amine have substantially reacted. Moreover, the benefit of the invention is not achieved if the complexing agent is contacted with the acyl halide in a manner which does not permit the formation of an association therebetween. For example, if a particular complexing agent is insufficiently soluble or dispersible within an acyl halide solution, it is unlikely that the full benefits of the subject invention will be realized as an insufficient degree of association will occur. Consequently, preferred embodiments of the invention utilize complexing agents which are substantially soluble in the acyl halide solution and which readily form associations with acyl halides. As described elsewhere, preferred complexing agents have a solubility parameter of from about 15 to about 26, and more preferably from 18 to 23 $J^{1/2}cm^{-3/2}$.

In preferred embodiments, the subject complexing agent is directly added to the acyl halide solution prior to contacting (e.g. coating) the acyl halide and amine solutions, thereby permitting sufficient opportunity for the formation of an association prior to reaction between the amine and acyl halide. Alternatively, the acyl halide and complexing agent may be contacted "neat" and subsequently added to solution for coating.

In a less preferred alternative embodiment, the complexing agent(s) may be contacted with the acyl halide solution (e.g., via spray) while the acyl halide solution is contacted with the polyfunctional amine solution. In this embodiment, the complexing agent is essentially contacted with the acyl halide solution simultaneously with the step of contacting the acyl halide and amine solution but prior to complete reaction between the amine and acyl halide. In this embodiment the acyl halide and complexing agent have a much shorter time period to form a complex prior to complete reaction between the acyl halide and amine. Alternatively, the complexing agent may be contacted with the acyl halide solution after the acyl halide and amine solutions have been contacted but prior to complete reaction therebetween. As previously indicated, this embodiment provides a much shorter time period for complex formation to occur prior to complete reaction between the acyl halide and amine.

In a still less preferred embodiment, the complexing agent may be coated on the support or added to the amine solution prior to contacting the amine and acyl halide solutions. These approaches are less preferred as it is difficult to deliver the complexing agent to the acyl halide in a manner which allows suitable complex formation prior to completion of the reaction between the acyl halide and amine. However, one remedial approach includes the formation of a high internal phase emulsion of the complexing agent within the amine solution, thereby providing a relatively uniform delivery of the complexing agent to the acyl halide during reaction between the acyl halide and amine. Formation of high internal phase emulsions are well known and are described in U.S. Pat. No. 5,977,194 which is incorporated herein by reference. Other suitable approaches involve the selection of complexing agents having sufficient solubility in the amine solution (e.g., aqueous solutions) in order to be uniformly dispersed, while simultaneously being sufficiently soluble in the acyl halide solution (e.g., organic solution) such that a sufficient amount of complexing agent is provided to the acyl halide prior to completion of reaction between the acyl halide and amine.

The embodiments described above may be used in combination, e.g. the subject complexing agent may be added to both the acyl halide and amine solutions prior to contacting the solutions. Alternatively, the complexing agent may be added to either solution while also being applied via spray or vapor deposition during the step of coating the solutions.

One means for determining whether the subject complexing agent(s) have been successfully contacted with the acyl halide in accordance to the subject method is the presence of a "detectable quantity" of "retained" complexing agent in the polyamide membrane. The term "retained" is intended to mean complexing agent which remains (e.g., associated, covalently bonded, complexed, weakly bound, etc.) within the polyamide membrane even after the membrane has been subjected to operation in reverse osmosis mode using pure water feed at a 24 gfd (gallons per square foot per day) (0.0011 cm/sec) flux rate through the membrane with a permeate recovery between 0.5% to 25% at 25° C. for 24 hours. This may be accomplished by use of test cells commonly used to test membranes. For example, the test cell may be of a "plate and frame" design or may include preparing a spiral wound element with the membrane.

Cleaning with pure water, e.g. passing pure water across the polyamide membrane at 25° C. for 24 hours at a pressure of about 70 pounds per square inch. Such cleaning removes transient sources of materials which may be initially present but which do not contribute to the subject invention. For example, it is well known that phosphoric acid may be added to the amine solution as a pH buffer. In such embodiments some portion of the phosphoric acid may be present on the initial resulting membrane; however, as the phosphoric acid is not contacted with the acyl halide in manner which permits sufficient association, the phosphoric acid is not retained and is washed away from the membrane upon use or cleaning. Although such prior art uses of phosphoric acid may be used in conjunction with the subject invention, such prior art embodiments do not result in "retained" phosphorous, nor the degree of improved membrane performance attributed to the subject invention.

The term "detectable quantity" is intended to mean a sufficient quantity of retained complexing agent is present such that it may be measured, identified or otherwise detected by quantitative or qualitative analysis. Detection of such complexing agents in membranes can be made by way of any suitable analytical technique; however due to the relatively low quantities of complexing agent typically utilized, relatively sensitive analytical techniques are preferred, e.g. gas chromatography, X-ray fluorescence, (XRF), secondary ion mass spectroscopy, IR, and colorimetric analysis of the fully combusted polyamide. Detection of the complexing agent typically focuses upon the binding core of the complexing agent. As described in more detail below, the binding core often comprises metals, e.g. Pb, Fe, Cr, Ni, Co, Cu, Zn, Al, As, Sb, Te, etc. but may include other elements, e.g. P, Si, Se, Ge, etc. One specific X-ray fluorescence detection methodology is particularly well suited for detecting phosphorous containing complexing agents and involves extracting a portion (e.g., 100 mg) of the polyamide polymer from the porous support, e.g., boiling the membrane in water for about 30 minutes followed by dissolving the porous support with an appropriate solvent, e.g., methylene chloride, and subsequently extensively extracting the polyamide in the same solvent. The polyamide may then be isolated and pressed into a 13 mm diameter disk using a die and an hydraulic press (10,000 lbs. load). The resulting disk may be placed between two layers of polypropylene sample support film (6.0 micron thickness) and attached to a Chemplex 30 mm diameter XRF sample cup using a standard support ring. The sample can be measured in a plastic insert with a Pb mask. Measurements can be obtained on both sides of the disk and averaged together. Once prepared, the sample can be analyzed with a Philips PW1480 wavelength dispersive X-ray fluorescence spectrometer equipped with a scandium anode 3KW X-ray tube. For example, phosphorous can be measured by utilizing K alpha X-ray intensity with the instrument operated under the following conditions: 50 kV, 50 mA, germanium crystal (2d=6.532 angstroms), gas flow proportional detector (argon/methane), upper and lower discriminator level 80/25, He purge. The phosphorous K alpha peak can be measured at a 2 theta angle of 141.035 and backgrounds can be measured at + and − offsets of 1.5. Peak and background measurements are commonly taken for 10 seconds each.

In preferred embodiments, the subject polyamide composite membrane includes at least about 25 micrograms (and preferably at least 50 micrograms, more preferably 100 micrograms and in some embodiments at least 200 micrograms) of the binding core of the complexing agent "retained" for every gram of polyamide. The elements that constitute the binding core of the subject complexing agents are not typically present during conventional membrane preparation. As such, these elements serve as a good indicator as to whether the subject complexing agents have been used effectively during membrane preparation.

As indicated, the retained complexing agent is believed to be a result of the formation of a complex between the complexing agent and the polyamide, retained monomers, and/or reaction products. Although dependent upon the relative density of the polyamide layer, most membranes of the subject invention will include at least 0.02 micrograms of complexing agent per square meter of membrane, but more commonly more than about 1 microgram of complexing agent per square meter of membrane.

The complexing agents of the present invention are not particularly limited and different species of compounds may be used in combination. However, preferred species are non-pyrophoric, sufficiently stable in air and water (i.e., the species do not decompose, degrade or significantly react with water or air within the time period of the subject method), and have suitable industrial hygiene properties, e.g., do not pose significant environmental hazards, do not require expansive handling requirements, do not pose significant safety concerns, etc. The subject complexing agents are preferably "substantially soluble" in the organic solutions as described herein. The term "substantially soluble" is intended to mean that a sufficient quantity of the complexing agent dissolves in the solution to result in a final membrane having improved flux, rejection and/or lower operating pressure as compared to an identical membrane prepared without the subject complexing agent. An additional indicia that the complexing agent is "substantially soluble" is the presence of a detectable quantity of retained complexing agent in the polyamide layer. When used at effective concentrations the subject complexing agents preferably dissolve and form a single homogeneous phase within the organic solutions previously described. Preferred complexing agents have a solubility parameter of from about 15 to about 26, and more preferably from 18 to 23 $J^{1/2}cm^{-3/2}$.

Regardless of the means of contacting the complexing agent with the acyl halide solution, the quantity of complexing agent is preferably stoichiometrically related to the quantity of polyfunctional acyl halide. Preferred stoichiometric ratios of complexing agent to polyfunctional acyl halide range from about 1:5 to about 5:1 with 1:1 to about 3:1 being most preferred. Although preferred, stoichiometric ratios of the complexing agent are not required. When combined directly with the acyl halide solutions, the complexing agent typically comprises from about 0.001 to about 2 weight percent of the acyl halide solution. When utilized according to alternative embodiments as previously described, larger quantities of the complexing agent may be required.

Unlike conventional interfacial polymerization of polyfunctional acyl halide and polyfunctional amines in which the relative concentration of the acyl halide species is rate controlling, in the present invention the relative concentration of the amine species may take on a more significant role. Through routine experimentation, those skilled in the art will appreciate the optimum concentration of polyfunctional amine, given the specific nature and concentration of the complexing agent(s), acyl halide, and amine, reaction conditions and desired membrane performance.

The subject complexing agents include a wide variety of compounds which may be generally described according to Formula I:

where $\alpha$ is a non-sulfur containing binding core selected from elements falling within: (a) Group IIIA-VIB (i.e. Groups IIIA, IVA, VA, VIA, VIIA, VIIIA, IB, IIB, IIIB, IVB, VB, VIB) and (b) Periods 3–6 (i.e. Periods starting with Na, K, Rb, and Cs) of the conventional IUPAC periodic table. Groups IIIA through VIB of the conventional IUPAC form of the Periodic Table corresponds to: Groups 3–16 of the "new notation" IUPAC Periodic Table and Groups IIIB-VIA of the CAS version of the Periodic Table. In order to avoid any confusion further reference herein will utilize the conventional IUPAC Periodic Table, i.e. Group IIIA corresponds to the column starting with Sc, Y, La, etc, and Group VIB corresponds to the column starting with O, S, Se, Te, Po. Specific examples include: (1) the following metals: aluminum, scandium, titanium, vanadium, chromium, manganese, iron, cobalt, nickel, copper, zinc, gallium, germanium, arsenic, yttrium, zirconium, niobium, molybdenum, technetium, ruthenium, rhodium, palladium, silver, cadmium, indium, tin, antimony, tellurium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth (bismuth is not typically preferred), and polonium; (2) the following semi-conductors: silicon, selenium, and germanium and (3) phosphorous. Particularly preferred binding cores include: Al, Si, P, As, Sb, Se and Te and metals such as: Fe, Cr, Co, Ni, Cu, and Zn. L is an optional chemical linking group, the same or different, selected from linkages such as: carbon containing moieties, e.g. aromatic groups, alkanes, alkenes, —O—, —S—, —N—, —H—, —P—, —O—P—, and —O—P—O—, (each of which may be substituted or unsubstituted). β is solubilizing group, the same or different, and includes from 1 to 12 carbon atoms which may be substituted or unsubstituted and which may include internal linking groups as defined by L. Examples include aliphatic and arene groups having 1 to 6 carbon atoms, aromatic groups, heterocyclic groups, and alkyl groups. "x" is an integer from 0 to 1 and "y" is an integer from 1 to 5, preferably from 2 to 4.

Although dependant upon the specific solvent(s) and acyl halide species utilized, the following complexing agents are generally useful in the subject invention: tri-phenyl derivatives of phosphorous (e.g. phosphine, phosphate), bismuth, arsenic and antimony; alkane oxy esters of phosphorous including tributyl and dibutyl phosphite; organo-metallic complexes such as ferrocene and tetraethyl lead, and acetylacetonate complexes of iron (II), iron (III), cobalt (III) and Cr (III).

Complexing agents including a phosphorus binding core have been found to be particularly preferred. A preferred class of such phosphorous containing compounds can be represented below by following Formula 1:

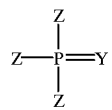

Formula 1 wherein Z is the same or different and is selected from X, O—P—(X)$_2$, P(O)—X$_2$, (P(—X))$_m$—P—X$_2$, (O—P(—X))$_m$—O—P—X$_2$, (P(O)(—X))$_m$—P(O)—X$_2$, and (O—P(O)(—X))$_m$—O—P(O)—X$_2$, wherein P is phosphorous, O is oxygen, m is an integer from 1 to 5; and Y is O (oxygen) or a non-bonded pair of electrons, as indicated in Formula 2 and 3, respectively;

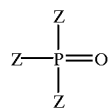

Formula 2

Formula 3 wherein X is the same or different and is selected from: R or R including oxygen and/or alkyl linkage(s), e.g., R—O—R, O—R, etc; and R is the same or different and is selected from H (hydrogen), and/or a carbon containing moiety. The Z groups are preferably selected such that they collectively result in the phosphorous containing compound being substantially soluble in the organic solution.

The phrase "the same or different" is intended to mean that the individual groups represented by a single symbol, e.g., "R", may vary within a given compound. For example, for any given compound, one R group may be hydrogen whereas the other R groups may be butyl groups.

The term "carbon containing moiety" is intended to mean branched and unbranched acyclic groups, e.g., methyl, ethyl, propyl, isopropyl, butyl, isobutyl, pentyl, 2-pentyl, 3-pentyl, tert-butyl, etc. which may be unsubstituted or substituted (e.g., substituted with amide groups, ether groups, ester groups, sulfone groups, carbonyl groups, anhydrides, cyanide, nitrile, isocynate, urethane, beta-hydroxy ester, double and triple bonds etc.), and cyclic groups, e.g., cyclo pentyl, cyclo hexyl, aromatics, e.g., phenyl, heterocyclic (e.g. pryridine), etc., which may be unsubstituted or substituted, (e.g., substituted with methyl, ethyl, propyl, hydroxyl, amide, ether, sulfone, carbonyl, ester, etc.). Cyclo moieties may be linked to the phosphorous atom by way of an aliphatic linking group, e.g., methyl, ethyl, etc.

Preferred carbon containing moieties include unsubstituted, branched or unbranched $C_1$–$C_{12}$ groups, and more preferably $C_1$–$C_8$ aliphatic groups such as: methyl, ethyl, propyl, isopropyl, butyl, 2-methyl butyl, 3-methyl butyl, 2-ethyl butyl, pentyl, hexyl, etc. Additionally, preferred moieties include phenyl groups.

Examples of preferred sub-classes of compounds are represented by Formulae 4–9.

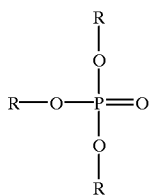

Formula 4

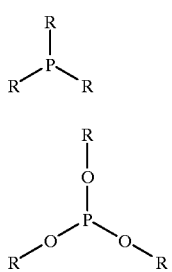

Formula 5

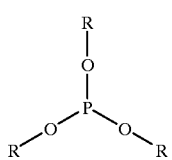

Formula 6

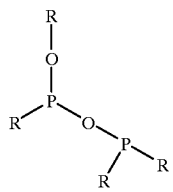

Formula 7

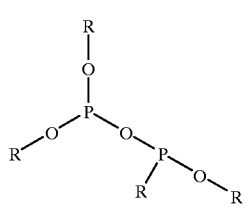

Formula 8

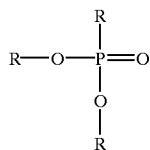

Formula 9 wherein R, P and O are as previously defined. Such phosphorous containing compounds are commercially available or can be synthesized using known methodologies, see for example U.S. Pat. No. 2,648,696 to Whetstone, incorporated herein by reference, and Aharoni et al., *Journal of Polymer Science*, Volume 22, 2579–2599.

The phosphorous nomenclature utilized herein is intended to be consistent with that used in D. Corbridge's Studies in Inorganic Chemistry, 6: Phosphorous—An Outline of its Chemistry, Biochemistry and Technology, third ed., (Elsevier 1985). Examples of classes of applicable phosphorous containing compounds include: phosphates (e.g., phosphate esters), phosphites, phosphines, phosphine oxides, phosphonates, including diphosphonates, phosphinates, phosphinites, phosphonites, pyrophosphates, pyrophosphoramides, phosphor amides, phosphorothionates including phosphoro dithionates, phosphorodithionates, phosphoro amido thionates, and phosphonothioates including phosphonodithioates. A non-comprehensive list of specific examples of each class are provided below.

Specific examples of tri-phosphates include:
tri-methyl phosphate, tri-ethyl phosphate, tri-(1-propyl) phosphate, tri-(2-propyl) phosphate, tri-(1-butyl) phosphate, tri-(2-butyl) phosphate, tri-(1-tert-butyl) phosphate, tri-(2-tert-butyl) phosphate, tri-(1-pentyl) phosphate, tri-(2-pentyl) phosphate, tri-(3-pentyl) phosphate, tri-(1-hexyl) phosphate, tri-(2-hexyl) phosphate, tri-(3-hexyl) phosphate, tri-(1-heptyl) phosphate, tri-(2-heptyl) phosphate, tri-(3-heptyl) phosphate, tri-(4-heptyl) phosphate, tri-(1-octyl) phosphate, tri-(2-octyl) phosphate, tri-(3-octyl) phosphate, tri-(4-octyl) phosphate, tri-(1-CH3(CH2)8) phosphate, tri-(2-CH3(CH2)8) phosphate, tri-(3-CH3 (CH2)8) phosphate, tri-(4-CH3(CH2)8) phosphate, tri-(1-CH3(CH2)9) phosphate, tri-(2-CH3(CH2)9) phosphate, tri-(3-CH3(CH2)9) phosphate, tri-(4-CH3(CH2)9) phosphate, tri-(5-CH3(CH2)9) phosphate, tri-(1-CH3 (CH2)10) phosphate, tri-(2-CH3(CH2)10) phosphate, tri-(3-CH3(CH2)10) phosphate, tri-(4-CH3(CH2)10) phosphate, tri-(5-CH3(CH2)10) phosphate, tri-(1-CH3 (CH2)11) phosphate, tri-(2-CH3(CH2)11) phosphate, tri-(3-CH3(CH2)11) phosphate, tri-(4-CH3(CH2)11)

phosphate, tri-(5-CH3(CH2)11) phosphate, tri-(6-CH3(CH2)11) phosphate, tri-(1-CH3(CH2)12) phosphate, tri-(2-CH3(CH2)12) phosphate, tri-(3-CH3(CH2)12) phosphate, tri-(4-CH3(CH2)12) phosphate, tri-(5-CH3(CH2)12) phosphate, tri-(6-CH3(CH2)12) phosphate, tri-(methyl pentyl) phosphate, tri-(ethyl pentyl) phosphate, tri-(methyl hexyl) phosphate, tri-(ethyl hexyl) phosphate, tri-(propyl hexyl) phosphate, tri-(methyl heptyl) phosphate, tri-(ethyl heptyl) phosphate, tri-(diethyl heptyl) phosphate, tri-(methyl octyl) phosphate, tri-(dimethyl octyl) phosphate, methyl di-(-ethyl) phosphate, methyl di-(1-propyl) phosphate, methyl di-(2-propyl) phosphate, methyl di-(1-butyl) phosphate, methyl di-(2-butyl) phosphate, methyl di-(1-tert-butyl) phosphate, methyl di-(2-tert-butyl) phosphate, methyl di-(1-pentyl) phosphate, methyl di-(2-pentyl) phosphate, methyl di-(3-pentyl) phosphate, methyl di-(1-hexyl) phosphate, methyl di-(2-hexyl) phosphate, methyl di-(3-hexyl) phosphate, methyl di-(1-heptyl) phosphate, methyl di-(2-heptyl) phosphate, methyl di-(3-heptyl) phosphate, methyl di-(4-heptyl) phosphate, methyl di-(2-octyl) phosphate, methyl di-(2-octyl) phosphate, methyl di-(3-octyl) phosphate, methyl di-(4-octyl) phosphate, methyl di-(2-CH3(CH2)8) phosphate, methyl di-(2-CH3(CH2)8) phosphate, methyl di-(3-CH3(CH2)8) phosphate, methyl di-(4-CH3(CH2)8) phosphate, methyl di-(3-CH3(CH2)9) phosphate, methyl di-(2-CH3(CH2)9) phosphate, methyl di-(3-CH3(CH2)9) phosphate, methyl di-(4-CH3(CH2)9) phosphate, methyl di-(5-CH3(CH2)9) phosphate, methyl di-(1-CH3(CH2)10) phosphate, methyl di-(2-CH3(CH2)10) phosphate, methyl di-(3-CH3(CH2)10) phosphate, methyl di-(4-CH3(CH2)10) phosphate, methyl di-(5-CH3(CH2)10) phosphate, methyl di-(1-CH3(CH2)11) phosphate, methyl di-(2-CH3(CH2)11) phosphate, methyl di-(3-CH3(CH2)11) phosphate, methyl di-(4-CH3(CH2)11) phosphate, methyl di-(5-CH3(CH2)11) phosphate, methyl di-(6-CH3(CH2)11) phosphate, methyl di-(1-CH3(CH2)12) phosphate, methyl di-(2-CH3(CH2)12) phosphate, methyl di-(3-CH3(CH2)12) phosphate, methyl di-(4-CH3(CH2)12) phosphate, methyl di-(5-CH3(CH2)12) phosphate, methyl di-(6-CH3(CH2)12) phosphate, ethyl di-(1-propyl) phosphate, ethyl di-(2-propyl) phosphate, ethyl di-(1-butyl) phosphate, ethyl di-(2-butyl) phosphate, ethyl di-(1-tert-butyl) phosphate, ethyl di-(2-tert-butyl) phosphate, ethyl di-(1-pentyl) phosphate, ethyl di-(2-pentyl) phosphate, ethyl di-(3-pentyl) phosphate, ethyl di-(1-hexyl) phosphate, ethyl di-(2-hexyl) phosphate, ethyl di-(3-hexyl) phosphate, ethyl di-(1-heptyl) phosphate, ethyl di-(2-heptyl) phosphate, ethyl di-(3-heptyl) phosphate, ethyl di-(4-heptyl) phosphate, ethyl di-(1-octyl) phosphate, ethyl di-(2-octyl) phosphate, ethyl di-(3-octyl) phosphate, ethyl di-(4-octyl) phosphate, ethyl di-(1-CH3(CH2)8) phosphate, ethyl di-(2-CH3(CH2)8) phosphate, ethyl di-(3-CH3(CH2)8) phosphate, ethyl di-(4-CH3(CH2)8) phosphate, ethyl di-(1-CH3(CH2)9) phosphate, ethyl di-(2-CH3(CH2)9) phosphate, ethyl di-(3-CH3(CH2)9) phosphate, ethyl di-(4-CH3(CH2)9) phosphate, ethyl di-(5-CH3(CH2)9) phosphate, ethyl di-(1-CH3(CH2)10) phosphate, ethyl di-(2-CH3(CH2)10) phosphate, ethyl di-(3-CH3(CH2)10) phosphate, ethyl di-(4-CH3(CH2)10) phosphate, ethyl di-(5-CH3(CH2)10) phosphate, ethyl di-(1-CH3(CH2)11) phosphate, ethyl di-(2-CH3(CH2)11) phosphate, ethyl di-(3-CH3(CH2)11) phosphate, ethyl di-(4-CH3(CH2)11) phosphate, ethyl di-(5-CH3(CH2)11) phosphate, ethyl di-(6-CH3(CH2)11) phosphate, ethyl di-(5-CH3(CH2)12) phosphate, ethyl di-(2-CH3(CH2)12) phosphate, ethyl di-(3-CH3(CH2)12) phosphate, ethyl di-(4-CH3(CH2)12) phosphate, ethyl di-(5-CH3(CH2)12) phosphate, ethyl di-(6-CH3(CH2)12) phosphate, 1-propyl di-(2-propyl) phosphate, 1-propyl di-(1-butyl) phosphate, 1-propyl di-(2-butyl) phosphate, 1-propyl di-(1-tert-butyl) phosphate, 1-propyl di-(2-tert-butyl) phosphate, 1-propyl di-(1-pentyl) phosphate, 1-propyl di-(2-pentyl) phosphate, 1-propyl di-(3-pentyl) phosphate, 1-propyl di-(1-hexyl) phosphate, 1-propyl di-(2-hexyl) phosphate, 1-propyl di-(3-hexyl) phosphate, 1-propyl di-(1-heptyl) phosphate, 1-propyl di-(2-heptyl) phosphate, 1-propyl di-(3-heptyl) phosphate, 1-propyl di-(4-heptyl) phosphate, 1-propyl di-(1-octyl) phosphate, 1-propyl di-(2-octyl) phosphate, 1-propyl di-(3-octyl) phosphate, 1-propyl di-(4-octyl) phosphate, 1-propyl di-(1-CH3(CH2)8) phosphate, 1-propyl di-(2-CH3(CH2)8) phosphate, 1-propyl di-(3-CH3(CH2)8) phosphate, 1-propyl di-(4-CH3(CH2)8) phosphate, 1-propyl di-(1-CH3(CH2)9) phosphate, 1-propyl di-(2-CH3(CH2)9) phosphate, 1-propyl di-(3-CH3(CH2)9) phosphate, 1-propyl di-(4-CH3(CH2)9) phosphate, 1-propyl di-(5-CH3(CH2)9) phosphate, 1-propyl di-(4-CH3(CH2)10) phosphate, 1-propyl di-(2-CH3(CH2)10) phosphate, 1-propyl di-(3-CH3(CH2)10) phosphate, 1-propyl di-(4-CH3(CH2)10) phosphate, 1-propyl di-(5-CH3(CH2)10) phosphate, 1-propyl di-(1-CH3(CH2)11) phosphate, 1-propyl di-(2-CH3(CH2)11) phosphate, 1-propyl di-(3-CH3(CH2)11) phosphate, 1-propyl di-(4-CH3(CH2)11) phosphate, 1-propyl di-(5-CH3(CH2)11) phosphate, 1-propyl di-(6-CH3(CH2)11) phosphate, 1-propyl di-(1-CH3(CH2)12) phosphate, 1-propyl di-(2-CH3(CH2)12) phosphate, 1-propyl di-(3-CH3(CH2)12) phosphate, 1-propyl di-(4-CH3(CH2)12) phosphate, 1-propyl di-(5-CH3(CH2)12) phosphate, 1-propyl di-(6-CH3(CH2)12) phosphate, 2-propyl di-(1-butyl) phosphate, 2-propyl di-(2-butyl) phosphate, 2-propyl di-(1-tert-butyl) phosphate, 2-propyl di-(2-tert-butyl) phosphate, 2-propyl di-(1-pentyl) phosphate, 2-propyl di-(2-pentyl) phosphate, 2-propyl di-(3-pentyl) phosphate, 2-propyl di-(1-hexyl) phosphate, 2-propyl di-(2-hexyl) phosphate, 2-propyl di-(3-hexyl) phosphate, 2-propyl di-(1-heptyl) phosphate, 2-propyl di-(2-heptyl) phosphate, 2-propyl di-(3-heptyl) phosphate, 2-propyl di-(4-heptyl) phosphate, 2-propyl di-(1-octyl) phosphate, 2-propyl di-(2-octyl) phosphate, 2-propyl di-(3-octyl) phosphate, 2-propyl di-(4-octyl) phosphate, 2-propyl di-(1CH3(CH2)8) phosphate, 2-propyl di-(2-CH3(CH2)8) phosphate, 2-propyl di-(3-CH3(CH2)8) phosphate, 2-propyl di-(4-CH3(CH2)8) phosphate, 2-propyl di-(3-CH3(CH2)9) phosphate, 2-propyl di-(2-CH3(CH2)9) phosphate, 2-propyl di-(3-CH3(CH2)9) phosphate, 2-propyl di-(4-CH3(CH2)9) phosphate, 2-propyl di-(5-CH3(CH2)9) phosphate, 2-propyl di-(1-CH3(CH2)10) phosphate, 2-propyl di-(2-CH3(CH2)10) phosphate, 2-propyl di-(3-CH3(CH2)10) phosphate, 2-propyl di-(4-CH3(CH2)10) phosphate, 2-propyl di-(5-CH3(CH2)10) phosphate, 2-propyl di-(1-CH3(CH2)11) phosphate, 2-propyl di-(2-CH3(CH2)11) phosphate, 2-propyl di-(3-CH3(CH2)11) phosphate, 2-propyl di-(4-CH3(CH2)11) phosphate, 2-propyl di-(5-CH3(CH2)11) phosphate, 2-propyl di-(6-CH3(CH2)11) phosphate, 2-propyl di-(1-CH3(CH2)12) phosphate, 2-propyl di-(2-CH3(CH2)12) phosphate, 2-propyl di-(3-CH3(CH2)12) phosphate, 2-propyl di-(4-CH3(CH2)12) phosphate, 2-propyl di-(5-CH3(CH2)12) phosphate, 2-propyl di-(6-CH3(CH2)12) phosphate, butyl di-(1-tert-butyl) phosphate, butyl di-(2-tert-butyl) phosphate, butyl di-(2-pentyl) phosphate, butyl di-(2-pentyl) phosphate, butyl di-(3-pentyl) phosphate, butyl di-(1-hexyl) phosphate, butyl di-(2-hexyl) phosphate, butyl di-(3-hexyl) phosphate, butyl di-(1-heptyl) phosphate, butyl di-(2-heptyl) phosphate, butyl di-(3-heptyl) phosphate, butyl di-(4-heptyl) phosphate, butyl di-(1-octyl) phosphate, butyl di-(2-octyl) phosphate, butyl di-(3-octyl) phosphate, butyl di-(4-octyl) phosphate, butyl di-(1-CH3(CH2)8) phosphate, butyl di-(2-CH3(CH2)8) phosphate, butyl di-(3-CH3(CH2)8) phosphate, butyl di-(4-CH3(CH2)8) phosphate, butyl di-(1-CH3(CH2)9) phosphate, butyl di-(2-CH3(CH2)9) phosphate, butyl di-(3-CH3(CH2)9) phosphate, butyl di-(4-CH3(CH2)9) phosphate, butyl di-(5-CH3(CH2)9) phosphate, butyl di-(1-CH3(CH2)10) phosphate, butyl di-(2-CH3(CH2)10) phosphate, butyl di-(3-CH3(CH2)10) phosphate, butyl di-(4-CH3(CH2)10) phosphate, butyl di-(5-CH3(CH2)10) phosphate, butyl di-(1-CH3(CH2)11) phosphate, butyl di-(2-CH3(CH2)11) phosphate, butyl di-(3-CH3(CH2)11) phosphate, butyl di-(4-CH3(CH2)11) phosphate, butyl di-(5-CH3(CH2)11) phosphate, butyl di-(6-CH3(CH2)11) phosphate, butyl di-(1-CH3(CH2)12) phosphate, butyl di-(2-CH3(CH2)12) phosphate, butyl di-(3-CH3(CH2)12) phosphate, butyl di-(4-CH3(CH2)12) phosphate, butyl di-(5-CH3(CH2)12) phosphate, butyl di-(6-CH3(CH2)12) phosphate, methyl ethyl propyl phosphate, methyl ethyl butyl phosphate, methyl ethyl pentyl phosphate, methyl ethyl hexyl phosphate, methyl ethyl heptyl phosphate, methyl ethyl octyl phosphate, methyl propyl butyl phosphate, methyl propyl pentyl phosphate, methyl propyl hexyl phosphate, methyl propyl heptyl phosphate, methyl propyl octyl phosphate, methyl butyl pentyl phosphate, methyl butyl hexyl phosphate, methyl butyl heptyl phosphate, methyl butyl octyl phosphate, methyl pentyl hexyl phosphate, methyl pentyl heptyl phosphate, methyl pentyl octyl phosphate, methyl hexyl heptyl phosphate, methyl hexyl octyl phosphate, ethyl propyl butyl phosphate, ethyl propyl pentyl phosphate, ethyl propyl hexyl phosphate, ethyl propyl heptyl phosphate, ethyl propyl octyl phosphate, ethyl butyl pentyl phosphate, ethyl butyl hexyl phosphate, ethyl butyl heptyl phosphate, ethyl butyl octyl phosphate, ethyl pentyl hexyl phosphate, ethyl pentyl heptyl phosphate, ethyl pentyl octyl phosphate, ethyl hexyl heptyl phosphate, ethyl hexyl octyl phosphate, tri-phenyl phosphate, methyl di-phenyl phosphate, ethyl di-phenyl phosphate, 1 propyl di-phenyl phosphate, 2 propyl di-phenyl phosphate, 1 butyl di-phenyl phosphate, 2 butyl di-phenyl phosphate, 1 tert-butyl di-phenyl phosphate, 2 tert-butyl di-phenyl phosphate, 1 pentyl di-phenyl phosphate, 2 pentyl di-phenyl phosphate, 3 pentyl di-phenyl phosphate, 1 hexyl di-phenyl phosphate, 2 hexyl di-phenyl phosphate, 3 hexyl di-phenyl phosphate, 1 heptyl di-phenyl phosphate, 2 heptyl di-phenyl phosphate, 3 heptyl di-phenyl phosphate, 4 heptyl di-phenyl phosphate, 1 octyl di-phenyl phosphate, 2 octyl di-phenyl phosphate, 3 octyl di-phenyl phosphate, 4 octyl di-phenyl phosphate, 1 CH3(CH2)8 di-phenyl phosphate, 2 CH3(CH2)8 di-phenyl phosphate, 3 CH3(CH2)8 di-phenyl phosphate, 4 CH3(CH2)8 di-phenyl phosphate, 1 CH3(CH2)9 di-phenyl phosphate, 2 CH3(CH2)9 di-phenyl phosphate, 3 CH3(CH2)9 di-phenyl phosphate, 4 CH3(CH2)9 di-phenyl phosphate, 5 CH3(CH2)9 di-phenyl phosphate, 1 CH3(CH2)10 di-phenyl phosphate, 2 CH3(CH2)10 di-phenyl phosphate, 3 CH3(CH2)10 di-phenyl phosphate, 4 CH3(CH2)10 di-phenyl phosphate, 5 CH3(CH2)10 di-phenyl phosphate, 1 CH3(CH2)11 di-phenyl phosphate, 2 CH3(CH2)11 di-phenyl phosphate, 3 CH3(CH2)11 di-phenyl phosphate, 4 CH3(CH2)11 di-phenyl phosphate, 5 CH3(CH2)11 di-phenyl phosphate, 6 CH3(CH2)11 di-phenyl phosphate, 1 CH3(CH2)12 di-phenyl phosphate, 2 CH3(CH2)12 di-phenyl phosphate, 3 CH3(CH2)12 di-phenyl phosphate, 4 CH3(CH2)12 di-phenyl phosphate, 5 CH3(CH2)12 di-phenyl phosphate, 6 CH3(CH2)12 di-phenyl phosphate, di-methyl phenyl phosphate, di-ethyl phenyl phosphate, di-(1-propyl) phenyl phosphate, di-(2-propyl) phenyl phosphate, di-(-isopropyl) phenyl phosphate, di-(1-butyl) phenyl phosphate, di-(2-butyl) phenyl phosphate, di-(1-tert-butyl) phenyl phosphate, di-(2-tert-butyl) phenyl phosphate, di-(1-pentyl) phenyl phosphate, di-(2-pentyl) phenyl phosphate, di-(3-pentyl) phenyl phosphate, di-(1-hexyl) phenyl phosphate, di-(2-hexyl) phenyl phosphate, di-(3-hexyl) phenyl phosphate, di-(1-heptyl) phenyl phosphate, di-(2-heptyl) phenyl phosphate, di-(3-heptyl) phenyl phosphate, di-(4-heptyl) phenyl phosphate, di-(1-octyl) phenyl phosphate, di-(2-octyl) phenyl phosphate, di-(3-octyl) phenyl phosphate, di-(4-octyl) phenyl phosphate, di-(1-CH3(CH2)8) phenyl phosphate, di-(2-CH3(CH2)8) phenyl phosphate, di-(3-CH3(CH2)8) phenyl phosphate, di-(4-CH3(CH2)8) phenyl phosphate, di-(1-CH3(CH2)9) phenyl phosphate, di-(2-CH3(CH2)9) phenyl phosphate, di-(3-CH3(CH2)9) phenyl phosphate, di-(4-CH3(CH2)9) phenyl phosphate, di-(5-CH3(CH2)9) phenyl phosphate, di-(1-CH3(CH2)10) phenyl phosphate, di-(2-CH3(CH2)10) phenyl phosphate, di-(3-CH3(CH2)10) phenyl phosphate, di-(4-CH3(CH2)10) phenyl phosphate, di-(5-CH3(CH2)10) phenyl phosphate, di-(4-CH3(CH2)11) phenyl phosphate, di-(2-CH3(CH2)10) phenyl phosphate, di-(3-CH3(CH2)11) phenyl phosphate, di-(4-CH3(CH2)11) phenyl phosphate, di-(5-CH3(CH2)11) phenyl phosphate, di-(6-CH3(CH2)11) phenyl phosphate, di-(5-CH3(CH2)12) phenyl phosphate, di-(2-CH3(CH2)12) phenyl phosphate, di-(3-CH3(CH2)12) phenyl phosphate, di-(4-CH3(CH2)12) phenyl phosphate, di-(5-CH3(CH2)12) phenyl phosphate, di-(6-CH3(CH2)12) phenyl phosphate, tri-ethylene phosphate, tri-(1-propene) phosphate, tri-(2-propene) phosphate, tri-(3-propene) phosphate, tri-(1-(1-butene)) phosphate, tri-(2-(1-butene)) phosphate, tri-(3-(1-butene)) phosphate, tri-(4-(1-butene)) phosphate, tri-(1-(2-butene)) phosphate, tri-(2-(2-butene)) phosphate, tri-(3-(2-butene)) phosphate, tri-(4-(2-butene)) phosphate, tri-(1-(1-pentene)) phosphate, tri-(2-(1-pentene)) phosphate, tri-(3-(1-pentene)) phosphate, tri-(4-(1-pentene)) phosphate, tri-(5-(1-pentene)) phosphate, tri-(1-(2-pentene)) phosphate, tri-(2-(2-pentene)) phosphate, tri-(3-(2-pentene)) phosphate, tri-(4-(2-pentene)) phosphate, tri-(5-(2-pentyl)) phosphate, tri-(1-(1-hexene)) phosphate, tri-(2-(1-hexene)) phosphate, tri-(3-(1-hexene)) phosphate, tri-(4-(1-hexene)) phosphate, tri-(5-(1-hexene)) phosphate, tri-(6-(1-hexene)) phosphate, tri-(1-(3-hexene)) phosphate, tri-(2-(3-hexene)) phosphate, tri-(3-(3-hexene)) phosphate, tri-(4-(3-hexene)) phosphate, tri-(5-(3-hexene)) phosphate, tri-(6-(3-hexene)) phosphate, tri-(1-(2-hexene)) phosphate, tri-(2-(2-hexene)) phosphate, tri-(3-(2-hexene)) phosphate, tri-(4-(2-hexene)) phosphate, tri-(5-(2-hexene)) phosphate, tri-(6-(2-hexene)) phosphate, tri-(phenyl methyl) phosphate, tri-(2-methyl phenyl) phosphate, tri-(3-methyl phenyl) phosphate, tri-(4-methyl phenyl) phosphate, tri-(2-ethyl phenyl) phosphate, tri-(3-ethyl phenyl) phosphate, and tri-(4-ethyl phenyl) phosphate.

Specific examples of di-phosphates include:
di-methyl phosphate, di-ethyl phosphate, di-(1-propyl) phosphate, di-(2-propyl) phosphate, di-(1-butyl)

phosphate, di-(2-butyl) phosphate, di-(1-tert-butyl) phosphate, di-(2-tert-butyl) phosphate, di-(1-pentyl) phosphate, di-(2-pentyl) phosphate, di-(3-pentyl) phosphate, di-(1-hexyl) phosphate, di-(2-hexyl) phosphate, di-(3-hexyl) phosphate, di-(1-heptyl) phosphate, di-(2-heptyl) phosphate, di-(3-heptyl) phosphate, di-(4-heptyl) phosphate, di-(1-octyl) phosphate, di-(2-octyl) phosphate, di-(3-octyl) phosphate, di-(4-octyl) phosphate, di-(1-CH3(CH2)8) phosphate, di-(2-CH3(CH2)8) phosphate, di-(3-CH3(CH2)8) phosphate, di-(4-CH3(CH2)8) phosphate, di-(1-CH3(CH2)9) phosphate, di-(2-CH3(CH2)9) phosphate, di-(3-CH3(CH2)9) phosphate, di-(4-CH3(CH2)9) phosphate, di-(5-CH3(CH2)9) phosphate, di-(1-CH3(CH2)10) phosphate, di-(2-CH3(CH2)10) phosphate, di-(3-CH3(CH2)10) phosphate, di-(4-CH3(CH2)10) phosphate, di-(5-CH3(CH2)10) phosphate, di-(1-CH3(CH2)11) phosphate, di-(2-CH3(CH2)11) phosphate, di-(3-CH3(CH2)11) phosphate, di-(4-CH3(CH2)11) phosphate, di-(5-CH3(CH2)11) phosphate, di-(6-CH3(CH2)11) phosphate, di-(1-CH3(CH2)12) phosphate, di-(2-CH3(CH2)12) phosphate, di-(3-CH3(CH2)12) phosphate, di-(4-CH3(CH2)12) phosphate, di-(5-CH3(CH2)12) phosphate, di-(6-CH3(CH2)12) phosphate, di-(1-(methyl pentyl)) phosphate, di-(2-(methyl pentyl)) phosphate, di-(3-(methyl pentyl)) phosphate, di-(1-(di-methyl pentyl)) phosphate, di-(2-(di-methyl pentyl)) phosphate, di-(3-(di-methyl pentyl)) phosphate, di-(1-(ethyl pentyl)) phosphate, di-(2-(ethyl pentyl)) phosphate, di-(3-(ethyl pentyl)) phosphate, di-(1-(methyl hexyl)) phosphate, di-(2-(methyl hexyl)) phosphate, di-(3-(methyl hexyl)) phosphate, di-(1-(di-methyl hexyl)) phosphate, di-(2-(di-methyl hexyl)) phosphate, di-(3-(di-methyl hexyl)) phosphate, di-(1-(ethyl hexyl)) phosphate, di-(2-(ethyl hexyl)) phosphate, di-(3-(ethyl hexyl)) phosphate, di-(methyl heptyl) phosphate, di-(di-methyl heptyl) phosphate, di-(ethyl heptyl) phosphate, di-(methyl octyl) phosphate, di-(di-methyl octyl) phosphate, di-(ethyl octyl) phosphate, methyl ethyl phosphate, methyl propyl phosphate, methyl butyl phosphate, methyl tert-butyl phosphate, methyl pentyl phosphate, methyl hexyl phosphate, methyl heptyl phosphate, methyl octyl phosphate, methyl CH3(CH2)8 phosphate, methyl CH3(CH2)9 phosphate, methyl CH3(CH2)10 phosphate, methyl CH3(CH2)11 phosphate, methyl CH3(CH2)12 phosphate, ethyl propyl phosphate, ethyl butyl phosphate, ethyl tert-butyl phosphate, ethyl pentyl phosphate, ethyl hexyl phosphate, ethyl heptyl phosphate, ethyl octyl phosphate, ethyl CH3(CH2)8 phosphate, ethyl CH3(CH2)9 phosphate, ethyl CH3(CH2)10 phosphate, ethyl CH3(CH2)11 phosphate, ethyl CH3(CH2)12 phosphate, propyl butyl phosphate, propyl tert-butyl phosphate, propyl pentyl phosphate, propyl hexyl phosphate, propyl heptyl phosphate, propyl octyl phosphate, propyl CH3(CH2)8 phosphate, propyl CH3(CH2)9 phosphate, propyl CH3(CH2)10 phosphate, propyl CH3(CH2)11 phosphate, propyl CH3(CH2)12 phosphate, butyl tert-butyl phosphate, tert-butyl pentyl phosphate, tert-butyl hexyl phosphate, tert-butyl heptyl phosphate, tert-butyl octyl phosphate, tert-butyl CH3(CH2)8 phosphate, tert-butyl CH3(CH2)9 phosphate, tert-butyl CH3(CH2)10 phosphate, tert-butyl CH3(CH2)11 phosphate, tert-butyl CH3(CH2)12 phosphate, pentyl hexyl phosphate, pentyl heptyl phosphate, pentyl octyl phosphate, pentyl CH3(CH2)8 phosphate, pentyl CH3(CH2)9 phosphate, pentyl CH3(CH2)10 phosphate, pentyl CH3(CH2)11 phosphate, pentyl CH3(CH2)12 phosphate, hexyl heptyl phosphate, hexyl octyl phosphate, hexyl CH3(CH2)8 phosphate, hexyl CH3(CH2)9 phosphate, hexyl CH3(CH2)10 phosphate, hexyl CH3(CH2)11 phosphate, hexyl CH3(CH2)12 phosphate, di-butene phosphate, di-pentene phosphate, di-hexene phosphate, di-heptene phosphate, and di-octene phosphate.

Specific examples of mono-phosphates include:

methyl phosphate, ethyl phosphate, propyl phosphate, butyl phosphate, pentyl phosphate, hexyl phosphate, heptyl phosphate, octyl phosphate, CH3(CH2)8 phosphate, CH3(CH2)9 phosphate, CH3(CH2)10 phosphate, CH3(CH2)11 phosphate, CH3(CH2)12 phosphate, methyl propyl phosphate, methyl butyl phosphate, methyl pentyl phosphate, methyl hexyl phosphate, methyl heptyl phosphate, methyl octyl phosphate, methyl CH3(CH2)8 phosphate, methyl CH3(CH2)9 phosphate, methyl CH3(CH2)10 phosphate, methyl CH3(CH2)11 phosphate, methyl CH3(CH2)12 phosphate, di-methyl butyl phosphate, di-methyl pentyl phosphate, di-methyl hexyl phosphate, di-methyl heptyl phosphate, di-methyl octyl phosphate, di-methyl CH3(CH2)8 phosphate, di-methyl CH3(CH2)9 phosphate, di-methyl CH3(CH2)10 phosphate, di-methyl CH3(CH2)11 phosphate, di-methyl CH3(CH2)12 phosphate, ethyl butyl phosphate, ethyl pentyl phosphate, ethyl hexyl phosphate, ethyl heptyl phosphate, ethyl octyl phosphate, ethyl CH3(CH2)8 phosphate, ethyl CH3(CH2)9 phosphate, ethyl CH3(CH2)10 phosphate, ethyl CH3(CH2)11 phosphate, ethyl CH3(CH2)12 phosphate, butene phosphate, pentene phosphate, hexene phosphate, heptene phosphate, and octene phosphate.

For purposes of brevity, a complete list of phosphites is not provided; however, applicable phosphite species correspond to the each of the tri, di, and mono phosphates provided in the preceding paragraphs. For example, by simply replacing the word "phosphate" with "phosphite" in the preceding paragraphs, one can quickly generate a list of representative phosphite species applicable to the subject invention.

Examples of phosphine compounds include:

tri-(1-hexyl) phosphine, tri-(2-hexyl) phosphine, tri-(3-hexyl) phosphine, tri-(4-heptyl) phosphine, tri-(2-heptyl) phosphine, tri-(3-heptyl) phosphine, tri-(4-heptyl) phosphine, tri-(1-octyl) phosphine, tri-(2-octyl) phosphine, tri-(3-octyl) phosphine, tri-(4-octyl) phosphine, tri-(1-CH3(CH2)8) phosphine, tri-(2-CH3(CH2)8) phosphine, tri-(3-CH3(CH2)8) phosphine, tri-(4-CH3(CH2)8) phosphine, tri-(1-CH3(CH2)9) phosphine, tri-(2-CH3(CH2)9) phosphine, tri-(3-CH3(CH2)9) phosphine, tri-(4-CH3(CH2)9) phosphine, tri-(5-CH3(CH2)9) phosphine, tri-(1-CH3(CH2)10) phosphine, tri-(2-CH3(CH2)10) phosphine, tri-(3-CH3(CH2)10) phosphine, tri-(4-CH3(CH2)10) phosphine, tri-(5-CH3(CH2)10) phosphine, tri-(1-CH3(CH2)11) phosphine, tri-(2-CH3(CH2)11) phosphine, tri-(3-CH3(CH2)11) phosphine, tri-(4-CH3(CH2)11) phosphine, tri-(5-CH3(CH2)11) phosphine, tri-(6-CH3(CH2)11) phosphine, tri-(1-CH3(CH2)12) phosphine, tri-(2-CH3(CH2)12) phosphine, tri-(3-CH3(CH2)12) phosphine, tri-(4-CH3(CH2)12) phosphine, tri-(5-CH3(CH2)12) phosphine, tri-(6-CH3(CH2)12) phosphine, methyl di-(1-hexyl) phosphine, methyl di-(2-hexyl) phosphine, methyl di-(3-hexyl) phosphine, methyl di-(1-heptyl) phosphine, methyl di-(2-heptyl) phosphine, methyl di-(3-heptyl) phosphine, methyl di-(4-heptyl) phosphine, methyl di-(1-octyl) phosphine, methyl di-(2-octyl) phosphine, methyl di-(3-octyl) phosphine, methyl di-(4-octyl) phosphine, methyl di-(1-CH3(CH2)8) phosphine, methyl di-(2-CH3(CH2)8) phosphine, methyl di-(3-CH3(CH2)8) phosphine, methyl di-(4-CH3(CH2)8) phosphine, methyl di-(1-CH3(CH2)9) phosphine, methyl di-(2-CH3(CH2)9) phosphine, methyl di-(3-CH3(CH2)9) phosphine, methyl di-(4-CH3(CH2)9) phosphine, methyl di-(5-CH3(CH2)9) phosphine, methyl di-(1-CH3(CH2)10) phosphine, methyl di-(2-CH3(CH2)10) phosphine, methyl di-(3-CH3(CH2)10) phosphine, methyl di-(4-CH3(CH2)10) phosphine, methyl di-(5-CH3(CH2)10) phosphine, methyl di-(1-CH3(CH2)11) phosphine, methyl di-(2-CH3(CH2)11) phosphine, methyl di-(3-CH3(CH2)11) phosphine, methyl di-(4-CH3(CH2)11) phosphine, methyl di-(5-CH3(CH2)11) phosphine, methyl di-(6-CH3(CH2)11) phosphine, methyl di-(1-CH3(CH2)12) phosphine, methyl di-(2-CH3(CH2)12) phosphine, methyl di-(3-CH3(CH2)12) phosphine, methyl di-(4-CH3(CH2)12) phosphine, methyl di-(5-CH3(CH2)12) phosphine, methyl di-(6-CH3(CH2)12) phosphine, ethyl di-(1-hexyl) phosphine, ethyl di-(2-hexyl) phosphine, ethyl di-(3-hexyl) phosphine, ethyl di-(1-heptyl) phosphine, ethyl di-(2-heptyl) phosphine, ethyl di-(3-heptyl) phosphine, ethyl di-(4-heptyl) phosphine, ethyl di-(1-octyl) phosphine, ethyl di-(2-octyl) phosphine, ethyl di-(3-octyl) phosphine, ethyl di-(4-octyl) phosphine, ethyl di-(1-CH3(CH2)8) phosphine, ethyl di-(2-CH3(CH2)8) phosphine, ethyl di-(3-CH3(CH2)8) phosphine, ethyl di-(4-CH3(CH2)8) phosphine, ethyl di-(1-CH3(CH2)9) phosphine, ethyl di-(2-CH3(CH2)9) phosphine, ethyl di-(3-CH3(CH2)9) phosphine, ethyl di-(4-CH3(CH2)9) phosphine, ethyl di-(5-CH3(CH2)9) phosphine, ethyl di-(1-CH3(CH2)10) phosphine, ethyl di-(2-CH3(CH2)10) phosphine, ethyl di-(3-CH3(CH2)10) phosphine, ethyl di-(4-CH3(CH2)10) phosphine, ethyl di-(5-CH3(CH2)10) phosphine, ethyl di-(1-CH3(CH2)10) phosphine, ethyl di-(2-CH3(CH2)11) phosphine, ethyl di-(3-CH3(CH2)1) phosphine, ethyl di-(4-CH3(CH2)10) phosphine, ethyl di-(5-CH3(CH2)11) phosphine, ethyl di-(6-CH3(CH2)11) phosphine, ethyl di-(1-CH3(CH2)12) phosphine, ethyl di-(2-CH3(CH2)12) phosphine, ethyl di-(3-CH3(CH2)12) phosphine, ethyl di-(4-CH3(CH2)12) phosphine, ethyl di-(5-CH3(CH2)12) phosphine, ethyl di-(6-CH3(CH2)12) phosphine, 1-propyl di-(1-hexyl) phosphine, 1-propyl di-(2-hexyl) phosphine, 1-propyl di-(3-hexyl) phosphine, 1-propyl di-(1-heptyl) phosphine, 1-propyl di-(2-heptyl) phosphine, 1-propyl di-(3-heptyl) phosphine, 1-propyl di-(4-heptyl) phosphine, 1-propyl di-(1-octyl) phosphine, 1-propyl di-(2-octyl) phosphine, 1-propyl di-(3-octyl) phosphine, 1-propyl di-(4-octyl) phosphine, 1-propyl di-(1-CH3(CH2)8) phosphine, 1-propyl di-(2-CH3(CH2)8) phosphine, 1-propyl di-(3-CH3(CH2)8) phosphine, 1-propyl di-(4-CH3(CH2)8) phosphine, 1-propyl di-(1-CH3(CH2)9) phosphine, 1-propyl di-(2-CH3(CH2)9) phosphine, 1-propyl di-(3-CH3(CH2)9) phosphine, 1-propyl di-(4-CH3(CH2)9) phosphine, 1-propyl di-(5-CH3(CH2)9) phosphine, 1-propyl di-(1-CH3(CH2)10) phosphine, 1-propyl di-(2-CH3(CH2)10) phosphine, 1-propyl di-(3-CH3(CH2)10) phosphine, 1-propyl di-(4-CH3(CH2)10) phosphine, 1-propyl di-(5-CH3(CH2)10) phosphine, 1-propyl di-(1-CH3(CH2)11) phosphine, 1-propyl di-(2-CH3(CH2)11) phosphine, 1-propyl di-(3-CH3(CH2)11) phosphine, 1-propyl di-(4-CH3(CH2)11) phosphine, 1-propyl di-(5-CH3(CH2)11) phosphine, 1-propyl di-(6-CH3(CH2)11) phosphine, 1-propyl di-(1-CH3(CH2)12) phosphine, 1-propyl di-(2-CH3(CH2)12) phosphine, 1-propyl di-(3-CH3(CH2)12) phosphine, 1-propyl di-(4-CH3(CH2)12) phosphine, 1-propyl di-(5-CH3(CH2)12) phosphine, 1-propyl di-(6-CH3(CH2)12) phosphine, 2-propyl di-(1-hexyl) phosphine, 2-propyl di-(2-hexyl) phosphine, 2-propyl di-(3-hexyl) phosphine, 2-propyl di-(1-heptyl) phosphine, 2-propyl di-(2-heptyl) phosphine, 2-propyl di-(3-heptyl) phosphine, 2-propyl di-(4-heptyl) phosphine, 2-propyl di-(1-octyl) phosphine, 2-propyl di-(2-octyl) phosphine, 2-propyl di-(3-octyl) phosphine, 2-propyl di-(4-octyl) phosphine, 2-propyl di-(1-CH3(CH2)8) phosphine, 2-propyl di-(2-CH3(CH2)8) phosphine, 2-propyl di-(3-CH3(CH2)8) phosphine, 2-propyl di-(4-CH3(CH2)8) phosphine, 2-propyl di-(1-CH3(CH2)9) phosphine, 2-propyl di-(2-CH3(CH2)9) phosphine, 2-propyl di-(3-CH3(CH2)9) phosphine, 2-propyl di-(4-CH3(CH2)9) phosphine, 2-propyl di-(5-CH3(CH2)9) phosphine, 2-propyl di-(1-CH3(CH2)10) phosphine, 2-propyl di-(2-CH3(CH2)10) phosphine, 2-propyl di-(3-CH3(CH2)10) phosphine, 2-propyl di-(4-CH3(CH2)10) phosphine, 2-propyl di-(5-CH3(CH2)10) phosphine, 2-propyl di-(1-CH3(CH2)11) phosphine, 2-propyl di-(2-CH3(CH2)11) phosphine, 2-propyl di-(3-CH3(CH2)11) phosphine, 2-propyl di-(4-CH3(CH2)11) phosphine, 2-propyl di-(5-CH3(CH2)11) phosphine, 2-propyl di-(6-CH3(CH2)11) phosphine, 2-propyl di-(1-CH3(CH2)12) phosphine, 2-propyl di-(2-CH3(CH2)12) phosphine, 2-propyl di-(3-CH3(CH2)12) phosphine, 2-propyl di-(4-CH3(CH2)12) phosphine, 2-propyl di-(5-CH3(CH2)12) phosphine, 2-propyl di-(6-CH3(CH2)12) phosphine, butyl di-(1-hexyl) phosphine, butyl di-(2-hexyl) phosphine, butyl di-(3-hexyl) phosphine, butyl di-(1-heptyl) phosphine, butyl di-(2-heptyl) phosphine, butyl di-(3-heptyl) phosphine, butyl di-(4-heptyl) phosphine, butyl di-(1-octyl) phosphine, butyl di-(2-octyl) phosphine, butyl di-(3-octyl) phosphine, butyl di-(4-octyl) phosphine, butyl di-(1-CH3(CH2)8) phosphine, butyl di-(2-CH3(CH2)8) phosphine, butyl di-(3-CH3(CH2)8) phosphine, butyl di-(4-CH3(CH2)8) phosphine, butyl di-(1-CH3(CH2)9) phosphine, butyl di-(2-CH3(CH2)9) phosphine, butyl di-(3-CH3(CH2)9) phosphine, butyl di-(4-CH3(CH2)9) phosphine, butyl di-(5-CH3(CH2)9) phosphine, butyl di-(1-CH3(CH2)10) phosphine, butyl di-(2-CH3(CH2)10) phosphine, butyl di-(3-CH3(CH2)10) phosphine, butyl di-(4-CH3(CH2)10) phosphine, butyl di-(5-CH3(CH2)10) phosphine, butyl di-(1-CH3(CH2)11) phosphine, butyl di-(2-CH3(CH2)11) phosphine, butyl di-(3-CH3(CH2)11) phosphine, butyl di-(4-CH3(CH2)11) phosphine, butyl di-(5-CH3(CH2)11) phosphine, butyl di-(6-CH3(CH2)11) phosphine, butyl di-(1-CH3(CH2)12) phosphine, butyl di-(2-CH3(CH2)12) phosphine, butyl di-(3-CH3(CH2)12) phosphine, butyl di-(4-CH3(CH2)12) phosphine, butyl di-(5-CH3(CH2)12) phosphine, butyl di-(6-CH3(CH2)12) phosphine, methyl hexyl heptyl phosphine, methyl hexyl octyl phosphine, ethyl propyl butyl phosphine, ethyl propyl pentyl phosphine, ethyl propyl hexyl phosphine, ethyl propyl heptyl phosphine, ethyl propyl octyl phosphine, ethyl butyl pentyl phosphine, ethyl butyl hexyl phosphine, ethyl butyl heptyl phosphine, ethyl butyl octyl phosphine, ethyl pentyl hexyl phosphine, ethyl pentyl heptyl phosphine, ethyl pentyl octyl phosphine, ethyl hexyl heptyl phosphine, ethyl hexyl octyl phosphine, tri-phenyl phosphine, 1 hexyl di-phenyl phosphine, 2 hexyl di-phenyl phosphine, 3 hexyl di-phenyl phosphine, 1 heptyl di-phenyl phosphine, 2 heptyl di-phenyl phosphine, 3 heptyl di-phenyl phosphine, 4 heptyl di-phenyl phosphine, 1 octyl di-phenyl phosphine, 2 octyl di-phenyl phosphine, 3 octyl di-phenyl phosphine, 4 octyl di-phenyl phosphine, 1 CH3(CH2)8 di-phenyl phosphine, 2 CH3(CH2)8 di-phenyl phosphine, 3 CH3(CH2)8 di-phenyl phosphine, 4 CH3(CH2)8 di-phenyl phosphine, 1 CH3(CH2)9 di-phenyl phosphine, 2 CH3(CH2)9 di-phenyl phosphine, 3 CH3(CH2)9 di-phenyl phosphine, 4 CH3(CH2)9 di-phenyl phosphine, 5 CH3(CH2)9 di-phenyl phosphine, 1 CH3(CH2)10 di-phenyl phosphine, 2 CH3(CH2)10 di-phenyl phosphine, 3 CH3(CH2)10 di-phenyl phosphine, 4 CH3(CH2)10 di-phenyl phosphine, 5 CH3(CH2)10 di-phenyl phosphine, 1 CH3(CH2)11 di-phenyl phosphine, 2 CH3(CH2)11 di-phenyl phosphine, 3 CH3(CH2)11 di-phenyl phosphine, 4 CH3(CH2)11 di-phenyl phosphine, 5 CH3(CH2)11 di-phenyl phosphine, 6 CH3(CH2)11 di-phenyl phosphine, 1 CH3(CH2)12 di-phenyl phosphine, 2 CH3(CH2)12 di-phenyl phosphine, 3 CH3(CH2)12 di-phenyl phosphine, 4 CH3(CH2)12 di-phenyl phosphine, 5 CH3(CH2)12 di-phenyl phosphine, 6 CH3(CH2)12 di-phenyl phosphine, di-(1-hexyl) phenyl phosphine, di-(2-hexyl) phenyl phosphine, di-(3-hexyl) phenyl phosphine, di-(1-heptyl) phenyl phosphine, di-(2-heptyl) phenyl phosphine, di-(3-heptyl) phenyl phosphine, di-(4-heptyl) phenyl phosphine, di-(1-octyl) phenyl phosphine, di-(2-octyl) phenyl phosphine, di-(3-octyl) phenyl phosphine, di-(4-octyl) phenyl phosphine, di-(1-CH3(CH2)8) phenyl phosphine, di-(2-CH3(CH2)8) phenyl phosphine, di-(3-CH3(CH2)8) phenyl phosphine, di-(4-CH3(CH2)8) phenyl phosphine, di-(1-CH3(CH2)9) phenyl phosphine, di-(2-CH3(CH2)9) phenyl phosphine, di-(3-CH3(CH2)9) phenyl phosphine, di-(4-CH3(CH2)9) phenyl phosphine, di-(5-CH3(CH2)9) phenyl phosphine, di-(1-CH3(CH2)10) phenyl phosphine, di-(2-CH3(CH2)10) phenyl phosphine, di-(3-CH3(CH2)10) phenyl phosphine, di-(4-CH3(CH2)10) phenyl phosphine, di-(5-CH3(CH2)10) phenyl phosphine, di-(1-CH3(CH2)11) phenyl phosphine, di-(2-CH3(CH2)11) phenyl phosphine, di-(3-CH3(CH2)11) phenyl phosphine, di-(4-CH3(CH2)11) phenyl phosphine, di-(5-CH3(CH2)11) phenyl phosphine, di-(6-CH3(CH2)11) phenyl phosphine, di-(1-CH3(CH2)12) phenyl phosphine, di-(2-CH3(CH2)12) phenyl phosphine, di-(3-CH3(CH2)12) phenyl phosphine, di-(4-CH3(CH2)12) phenyl phosphine, di-(5-CH3(CH2)12) phenyl phosphine, di-(6-CH3(CH2)12) phenyl phosphine, tri-(phenyl methyl) phosphine, tri-(2-methyl phenyl) phosphine, tri-(3-methyl phenyl) phosphine, tri-(4-methyl phenyl) phosphine, tri-(2-ethyl phenyl) phosphine, tri-(3-ethyl phenyl) phosphine, tri-(4-ethyl phenyl) phosphine, tri-(hexene) phosphine, tri-(heptene) phosphine, tri-(octene) phosphine, tri-(heptyl) phosphine, tri-(heptyl) phosphine, tri-(heptyl) phosphine, and tri-(heptyl) phosphine.

Examples of the phosphine oxides correspond to each of the above-listed phosphines. A listing of such oxides can be quickly generated by simply adding the word "oxides" to each of the above listed phosphine species.

Examples of di-phosphonates include:
tetra-methyl di-phosphonate, tetra-ethyl di-phosphonate, tetra-(1-propyl) di-phosphonate, tetra-(2-propyl) di-phosphonate, tetra-(1-butyl) di-phosphonate, tetra-(2-butyl) di-phosphonate, tetra-(1-tert-butyl) di-phosphonate, tetra-(2-tert-butyl) di-phosphonate, tetra-(1-pentyl) di-phosphonate, tetra-(2-pentyl) di-phosphonate, tetra-(3-pentyl) di-phosphonate, tetra-(1-hexyl) di-phosphonate, tetra-(2-hexyl) di-phosphonate, tetra-(3-hexyl) di-phosphonate, tetra-(1-heptyl) di-phosphonate, tetra-(2-heptyl) di-phosphonate, tetra-(3-heptyl) di-phosphonate, tetra-(4-heptyl) di-phosphonate, tetra-(1-octyl) di-phosphonate, tetra-(2-octyl) di-phosphonate, tetra-(3-octyl) di-phosphonate, tetra-(4-octyl) di-phosphonate, tetra-(1-CH3(CH2)8) di-phosphonate, tetra-(2-CH3(CH2)8) di-phosphonate, tetra-(3-CH3(CH2)8) di-phosphonate, tetra-(4-CH3(CH2)8) di-phosphonate, tetra-(1-CH3(CH2)9) di-phosphonate, tetra-(2-CH3(CH2)9) di-phosphonate, tetra-(3-CH3(CH2)9) di-phosphonate, tetra-(4-CH3(CH2)9) di-phosphonate, tetra-(5-CH3(CH2)9) di-phosphonate, tetra-(1-CH3(CH2)10) di-phosphonate, tetra-(2-CH3(CH2)10) di-phosphonate, tetra-(3-CH3(CH2)10) di-phosphonate, tetra-(4-CH3(CH2)10) di-phosphonate, tetra-(5-CH3(CH2)10) di-phosphonate, tetra-(1-CH3(CH2)11) di-phosphonate, tetra-(2-CH3(CH2)11) di-phosphonate, tetra-(3-CH3(CH2)11) di-phosphonate, tetra-(4-CH3(CH2)11) di-phosphonate, tetra-(5-CH3(CH2)11) di-phosphonate, tetra-(6-CH3(CH2)11) di-phosphonate, tetra-(1-CH3(CH2)12) di-phosphonate, tetra-(2-CH3(CH2)12) di-phosphonate, tetra-(3-CH3(CH2)12) di-phosphonate, tetra-(4-CH3(CH2)12) di-phosphonate, tetra-(5-CH3(CH2)12) di-phosphonate, tetra-(6-CH3(CH2)12) di-phosphonate, tetra-phenyl di-phosphonate, di-methyl-(di-ethyl) di-phosphonate, di-methyl-(di-phenyl) di-phosphonate, and di-methyl-(di-4-pentene) di-phosphonate.

Examples of pyrophosphate compounds include:
tetra-methyl pyrophosphate, tetra-ethyl pyrophosphate, tetra-(1-propyl) pyrophosphate, tetra-(2-propyl) pyrophosphate, tetra-(1-butyl) pyrophosphate, tetra-(2-butyl) pyrophosphate, tetra-(1-tert-butyl) pyrophosphate, tetra-(2-tert-butyl) pyrophosphate, tetra-(1-pentyl) pyrophosphate, tetra-(2-pentyl) pyrophosphate, tetra-(3-pentyl) pyrophosphate, tetra-(1-hexyl) pyrophosphate, tetra-(2-hexyl) pyrophosphate, tetra-(3-hexyl) pyrophosphate, tetra-(1-heptyl) pyrophosphate, tetra-(2-heptyl) pyrophosphate, tetra-(3-heptyl) pyrophosphate, tetra-(4-heptyl) pyrophosphate, tetra-(1-octyl) pyrophosphate, tetra-(2-octyl) pyrophosphate, tetra-(3-octyl) pyrophosphate, tetra-(4-octyl) pyrophosphate, tetra-(1-CH3(CH2)8) pyrophosphate, tetra-(2-CH3(CH2)8) pyrophosphate, tetra-(3-CH3(CH2)8) pyrophosphate, tetra-(4-CH3(CH2)8) pyrophosphate, tetra-(1-CH3(CH2)9) pyrophosphate, tetra-(2-CH3(CH2)9) pyrophosphate, tetra-(3-CH3(CH2)9) pyrophosphate, tetra-(4-CH3(CH2)9) pyrophosphate, tetra-(5-CH3(CH2)9) pyrophosphate, tetra-(1-CH3(CH2)10) pyrophosphate, tetra-(2-CH3(CH2)10) pyrophosphate, tetra-(3-CH3(CH2)10) pyrophosphate, tetra-(4-CH3(CH2)10) pyrophosphate, tetra-(5-CH3(CH2)10) pyrophosphate, tetra-(1-CH3(CH2)11) pyrophosphate, tetra-(2-CH3(CH2)11) pyrophosphate, tetra-(3-CH3(CH2)11) pyrophosphate, tetra-(4-CH3(CH2)11) pyrophosphate, tetra-(5-CH3(CH2)11) pyrophosphate, tetra-(6-CH3(CH2)11) pyrophosphate, tetra-(1-CH3(CH2)12) pyrophosphate, tetra-(2-CH3(CH2)12) pyrophosphate, tetra-(3-CH3(CH2)12) pyrophosphate, tetra-(4-CH3(CH2)12) pyrophosphate, tetra-(5-CH3(CH2)12) pyrophosphate, tetra-(6-CH3(CH2)12) pyrophosphate, tetra-phenyl pyrophosphate, di-methyl-(di-ethyl) pyrophosphate, di-methyl-(di-phenyl) pyrophosphate, and di-methyl-(di-4-pentene) pyrophosphate.

Examples of additional phosphorous containing compounds include those described in "Phosphorus Chemistry in Everyday Living" by A. Toy and E. Walsh (second edition, 1987, ACS, Washington, DC. Examples include: pyrophosphates, phosphonites, phosphorothioates, phosphonothioates, phosphonates, phosphorodithioates, bis-phosphorodithioates, phosphonodithioates, phosphoramidothioates, and pyrophosphoramide. Specific species include: tetra-propyl dithiono-pyrophosphate, tetraethyl dithiono-pyrophosphate, O-ethyl O-[2-(di-isopropyl amino)ethyl]methylphosphonite, O,O-dimethyl O-p-nitrohenyl phosphorothioate, O,O-diethyl O-p-nitrophenyl phosphorothioate, O,O-dimethyl O-(4-nitro-m-tolyl) phosphorothioate, O-ethyl O-p-nitrophenyl phenylphosphono-thioate, O,O-diethyl O-(3,5,6-trichloro-2-pyridyl) phosphorothioate, O,O-diethyl O-(2-isopropyl-6-methyl-4-pyrimidinyl) phosphorothioate, O,O-diethyl O-[4-methylsulfinyl)phenyl]phosphorothioate, O,O-dimethyl O-[3-methyl-4-(methyl thio)phenyl]phosphorothioate, O,O-dimethyl (2,2,2-trichloro-1-hydroxy-ethyl) phosphonate, 2,2-di-chlorovinyl di-methyl phosphate, 1,2-di-bromo-2,2-di-chloroethyl dimethyl phosphate, 2-chloro-1-(2,3,4-trichloro-phenyl)vinyl dimethyl phosphate, O-(4-bromo-2-chloro-phenyl) O-ethyl S-propyl phosphoro-thioate, O-ethyl-O-[4-(methyl-thio)phenyl]S-propyl phosphorodithioate, O-ethyl S,S-di-propyl phosphorodithioate, diethyl mercapto-succinate, S-ester with O,O-dimethyl phosphorodithioate, S-[(1,1-dimethyl-ethyl)-thio]methyl]O,O-di ethyl phosphorodithioate, O,O-dimethyl S-phthalimido-methyl phosphorodithoate, O,O-dimethyl S-4-oxo-1,2,3-benzotriazin 3(4H)-ylmethyl phosphorodithioate, O,O,O',O'''-tetraethyl S,S'-methlene bis-phosphorodithioate, S-[(6-chloro-2-oxo-3-(2H)-benzoxazolyl)methyl]O,O-di-ethyl phosphorodithionate, S-[(p-chlorophenyl-thio)methyl]O,O-diethyl phosphorodithioate, 1,4-p-dioxane-2,3,-di-thiol S,S-bis(O, O-diethyl phosphorodithioate, O-ethyl S-phenyl Ethyl-phosphonodithioate, O,S-dimethyl phosphoramidothioate, O,S-dimethyl acetyl-phosphoramidothioate, 1-methylethyl 2-[[ethoxy [(1-methylethyl) amino]phosphinothioy]oxy] benzoate, dimethyl dichlorovinyl phosphate, O,O-diethyl S-ethyl-thiomethyl phosphorodithioate, O,O-dimethyl S-(methyl-carbamoylmethyl) phosphorodithioate, ethyl 3-methyl-4-(methylthio)phenyl (1-methylethyl)-phosphoroamidate, O,O-dimethyl O-[2-(methycarbanmoyl)-1-methyl-vinyl]phosphate, and octamethylpyrophosphoramide.

Specific examples of phosphinates include: ethyl pentyl phosphinate, ethyl hexyl phosphinate, ethyl heptyl phosphinate, ethyl octyl phosphinate, ethyl decyl phosphinate, ethyl phenyl phosphinate, butyl pentyl phosphinate, butyl hexyl phosphinate, butyl heptyl phosphinate, pentyl dibutyl phosphinate, hexyl dibutyl phosphinate, and heptyl dibutyl phosphinate.

Examples of phosphinic acids include: pentyl phosphinic acid, hexyl phosphinic acid, heptyl phosphinic acid, octyl phosphinic acid, decyl phosphinic acid, phenyl phosphinic acid, di pentyl phosphinic acid, di heptyl phosphinic acid, di decyl phosphinic acid, di phenyl phosphinic acid, phenyl hexyl phosphinic acid, and pentyl decyl phosphinic acid.

Examples of phosphinous acids include: monopentyl phosphinous acid, monohexyl phosphinous acid, monoheptyl phosphinous acid, monooctyl phosphinous acid, monodecyl phosphinous acid, monophenyl phosphinous acid, dipropyl phosphinous acid, dipentyl phosphinous acid, diheptyl phosphinous acid, didecyl phosphinous acid, diphenyl phosphinous acid, and propyl decyl phosphinous acid.

Examples of phosphonates include: hexyl pentyl phosphonate, heptyl pentyl phosphonate, octyl pentyl phosphonate, decyl pentyl phosphonate, phenyl pentyl phosphonate, dibutyl pentyl phosphonate, dihexylphosphonate, heptylphosphonate, pentylphosphonate, octylphosphonate, and phenylphosphonate.

Examples of phosphonic acids include: pentyl phosphonic acid, hexyl phosphonic acid, heptyl phosphonic acid, octyl phosphonic acid, decyl phosphonic acid, phenyl phosphonic acid, methyl pentyl phosphonic acid, methyl phenyl phosphonic acid, pentylphosphonic acid, octylphosphonic acid, phenylphosphonic acid, and pentyl octylphosphonic acid.

Examples of phosphonites include: ethyl pentyl phosphonite, ethyl hexyl phosphonite, ethyl heptyl phosphonite, ethyl octyl phosphonite, ethyl decyl phosphonite, ethyl phenyl phosphonite, butyl pentyl phosphonite, butyl hexyl phosphonite, butyl heptyl phosphonite, diethyl pentyl phosphonite, diethyl hexyl phosphonite, and diethyl heptyl phosphonite.

Examples of phosphonous acids include: 1-pentyl phosphonous acid, 2-pentyl phosphonous acid, 3-pentyl phosphonous acid, 1-hexyl phosphonous acid, 2-hexyl phosphonous acid, 3-hexyl phosphonous acid, 1-heptyl phosphonous acid, 2-heptyl phosphonous acid, 3-heptyl phosphonous acid, 4-heptyl phosphonous acid, octyl phosphonous acid, decyl phosphonous acid, and phenyl phosphonous acid.

The material of construction of the porous support of the composite membrane is not critical to the invention. Any porous support that provides physical strength to the discriminating layer may be employed, so long as the pore sizes are sufficiently large to permit the unhindered passage of permeate but not so large as to interfere with the bridging-over of the resulting discriminating layer. Typical pore sizes will range from 10 to 1,000 nanometers. Typical support materials that are known in the art include cellulose esters, polysulfones, polyether sulfones, polyvinyl chloride, chlorinated polyvinyl chloride, polyvinylidene fluoride, polystyrenes, polycarbonates, polyimides, polyacrylonitriles, and polyesters. A particularly preferred class of support materials are polysulfones. Preparation of such supports are described in U.S. Pat. Nos. 3,926,798; 4,039,440; and 4,277,344, all of which are incorporated herein by reference. The thickness of the microporous support is usually 25 to 125 micrometers, and preferably from 40 to 75 micrometers.

A variety of membrane shapes are commercially available and useful in the present invention. These include spiral wound, hollow fiber, tubular, or flat sheet type membranes. In regard to the composition of the membrane, often the discriminating layer has hygroscopic polymers other than the polyamide coated upon the surface of the discriminating layer. Among these polymers are anionic, cationic, neutral and zwitterionic such as polymeric surfactants, polyvinyl alcohol, polyethylene imine and polyacrylic acid.

The membranes of the present invention may be subjected to various post treatments as described in U.S. Pat. Nos. 4,765,897; 5,876,602 and 5,755,964, all of which are incorporated herein by reference. Such post treatments may further enhance membrane performance, e.g., increased flux and/or decreased salt passage.

For example, as described in U.S. Pat. No. 5,876,602, membrane stability to strong base exposure (while maintaining flux and salt passage) can be achieved by contacting the membrane, after it has been formed on a porous support, whether in flat sheet or element form, with a hypochlorite solution at a pH of at least 10.5. The optimal exposure time depends on the temperature and concentration of the hypochlorite used. At room temperature, conditions which achieve the stated goals can generally be found within the ranges of 10 minutes to 5 hours and at concentrations of 200 to 10,000 ppm by weight of hypochlorite, measured as chlorine. Preferred concentrations of hypochlorite are 500 to 7,000 ppm; preferred exposure times are 30 minutes to three hours. In a preferred embodiment the membrane is subjected to a heat treatment before being exposed to the aforementioned chlorine treatment. The membranes are heated in water at a temperature of 40° C. to 100° C. for times of 30 seconds to 24 hours. The heat treatment results in a further lowering of the salt passage and the removal of impurities contained in the membrane which otherwise may interfere in the beneficial results of the chlorine treatment. Depending on the application desired, the two treatment conditions can be adjusted within the ranges stated such that the salt passage is improved while maintaining or even improving flux over either treatment alone. The order in which the two treatments are conducted is critical since heat treating the membrane simultaneously with or subsequently to the chlorine treatment does not provide the improved results obtained by first heat treating the membrane followed by the chlorine treatment.

Another example of an applicable post treatment is described in U.S. Pat. No. 5,755,964, which comprises contacting the discriminating layer with an amine from the group consisting of: ammonia optionally substituted with one or more alkyl groups of one to two carbons which alkyl groups may be further optionally substituted with one or more substituents selected from hydroxy, phenyl, or amino; butylamine; cyclohexylamine; 1,6-hexanediamine and mixtures thereof. Preferred substituted ammonia substances include those such as dimethylamine; trimethylamine; ethylamine; triethanolamine; N,N-dimethyl ethanolamine; ethylenediamine; and benzylamine. It has been discovered that by contacting the above amines with the discriminating layer, the flux is increased and the rejection rates for particular substances may be changed. The degree that the flux of the membrane is increased or enhanced may be controlled by varying the particular amine employed, the concentration of the amine, the time of contact between the discriminating layer and amine, the temperature of the contact, the pH of the amine solution, or combinations thereof. As the flux is increased, the selectivity of the membrane may change, i.e., the membrane may allow univalent ions such as sodium to pass through the membrane at a higher rate while only rejecting divalent ions and organic compounds.

The amine used to treat the polyamide discriminating layer may be in solution, neat, or even a gas phase so long as it can be contacted with the polyamide. Gas phases may typically be employed for lower molecular weight amines such as ammonia, methylamine, and dimethylamine. The solvent may be any solvent in which the amine is soluble so long as the flux enhancement and the performance of the membrane is not hindered by contact with the solvent. Typical solvents may include water and organic compounds such as alcohols and hydrocarbons provided the support is not dissolved by the solvent. Generally, because of its ease of handling and its availability, water is employed if a solvent is desired.

The extent that the flux of the membrane is enhanced when treated with the amines of this invention varies depending upon the particular amine employed. At least one general trend applies in most situations, however. The trend being that the more functional groups which are present on the amine, e.g., alcohol and/or amino groups, the greater the increase in flux. Correspondingly, the concentration of the amine and time of contact are interrelated and affect the degree of flux enhancement. The minimum length of time that a particular amine is required to be contacted with the discriminating layer for an increase in flux depends to a great extent upon the concentration of the amine. Generally, the higher the concentration of the amine, the shorter the necessary length of contacting time to increase the flux. In most cases, the concentration of the amine should be at least about 5, preferably at least about 20, most preferably at least about 50, to about 100 percent by weight. The minimum time of contact can be from at least about 15 seconds, preferably at least about one minute, more preferably at least about 30 minutes when contacted at ambient temperatures.

In general, the longer the time of contact and the higher the concentration of the amine, the greater the increase in flux. After a prolonged time of contact, the flux will reach its maximum increase and no longer increase. At this point, the membrane may be used or continued to be stored in the amine. The time to reach the maximum increase varies depending upon the particular amine employed, the concentration of the amine, and the temperature of contact but is ascertainable by one skilled in the art without undue experimentation by utilizing the general trends disclosed above. For most amines and concentrations, the flux of the membrane will be maximized once the discriminating layer has been contacted for about 5 days with the amine. If it is desired to shorten the minimum length of time of contact, then the surface temperature of the polyamide discriminating layer may be increased. Although this applies generally, it is particularly advantageous if low concentrations of an amine which might require a long contacting time are being employed. Although temperature from about 0° to about 30° C. are most conveniently used, increased temperatures may shorten the necessary contacting time. The increased temperatures should not be so high that the membrane's performance is reduced, i.e., not above about 130° C. Typical temperatures which will hasten the flux effect of the membrane are from at least about 30° C., preferably at least about 60° C. to about 130° C. These temperatures may be reached by contacting the amine with the polyamide discriminating layer in a device such as an oven or a dryer. Typical ovens or dryers which may be employed include convection, infrared, or forced air dryers.

The pH of the amine solution to be contacted with the polyamide is not a critical aspect of the invention. However, the pH should not be so low that the particular amine being employed precipitates out of solution. On the other hand, the pH should not be so high that the polyamide discriminating layer is degraded or performance is negated. Preferably, a pH of about 7 to about 12 is useful in the method of the present invention and for some amines higher pHs may increase the degree of flux enhancement.

The method used to contact the amine with the discriminating layer may be any which allows the amine to become associated with the polyamide for a sufficient time to increase the flux. For instance, the polyamide may be partially or totally immersed or soaked in the amine or amine solution. The amine or amine solution may also be passed through, sprayed onto, or rolled onto the discriminating layer. Although the aforementioned methods may also be useful when the amine is a gas, the contacting of a gaseous amine with the discriminating layer is advantageously accomplished in a closed vessel to minimize the amount of amine employed.

Improved flux and rejection properties can also be achieved by post treating the subject membranes by contacting the membranes with a strong mineral acid, e.g. phosphoric acid, polyphosphoric acid, phosphorous acid, sulfuric acid, etc. Phosphoric acid at concentrations of from about 10 to about 85 weight percent are particularly preferred. As described in U.S. Pat. No. 4,765,987, the membrane may be contacted with the mineral acid, e.g., by spraying an aqueous acid solution onto the membrane, dipping the membrane in an aqueous acid bath, etc. In some embodiments the acid solution may be heated. Once treated with the mineral acid, the membrane may be further treated with the rejection enhancing agents, e.g., colloids, tannic acid, polyamidoamines, etc, as described in U.S. Pat. No. 4,765,897.

As used herein the following terms have the definitions provided: "rejection rate" is the percentage of a particular dissolved or dispersed material (i.e., solute) which does not flow through the membrane with the solvent. The rejection rate is equal to 100 minus the percentage of dissolved or dispersed material which passes through the membrane, i.e., solute passage, "salt passage" if the dissolved material is a salt. "Flux" is the flow rate per unit area at which solvent, typically water, passes through the membrane. "Reverse osmosis membrane" is a membrane which has a rejection rate for NaCl of from about 95 to about 100 percent. "Nanofiltration membrane" is a membrane which has a rejection rate for NaCl of from about 0 to about 95 percent and has a rejection rate for at least one divalent ion or organic compound of from about 20 to about 100 percent. "Polyamide" is a polymer in which amide linkages (—C(O)NH—) occur along the molecular chain. "Complexing agent", "amine" and "acyl halide" are intended to mean a single species or multiple species of compounds intermixed. For example, the term "amine" may make reference to a mixture of polyfunctional amine monomers. The terms "percent by weight", "percent weight" and "weight percent" are intended to mean 100×(gram of solute/100 milliliters of solvent).

EXAMPLES

The following examples are intended to help illustrate the invention and should not be construed to limit the scope of the appended claims. Except where indicated otherwise, composite membranes were made in the laboratory using a porous polysulfone support formed from a 16.5 percent polysulfone solution in DMF. The support was cut into rectangles (11 in. by 7 in.), clipped onto wire frames (10 in. by 7.5 in.) and placed in a 2.5 weight percent meta phenylene diamine (MPD) solution for approximately 20 minutes. The MPD soaked supports were then placed on a paper towel and rolled with a rubber roller to remove excess solution from both the back and front sides. The support was then placed on a plastic sheet and a silicone rubber gasket placed around the edge. A plastic sheet was cut with the opening being the same size as the opening in the gasket. This was clamped to form a leak proof seal at the edge. 50 ml of a Isopar L solution of trimesyol chloride (TMC) (0.09 weight percent) containing a 1:2 stoichiometric ratio (TMC:complexing agent) of the complexing agent of interest was then poured on top. The specific complexing agent utilized in each example is provided in the Tables below. Control samples contained no complexing agent. After 1 minute of reaction, the TMC solution was poured off and the membrane was rinsed with hexane and allowed to dry for the period of time specified in the Tables below. The formed composite membrane was then placed in water and tested using a 2000 ppm NaCl solution with a pH between 6.5 and 8 at 130 psi applied pressure. The membranes were run under these test conditions for 30 min and then the permeate was collected and analyzed. The results are provided in the Tables below. Due to the variability in preparation and testing conditions, a separate control membrane was prepared and tested with each prepared batch of membranes, as indicated in each Table below.

TABLE 1

| Example No. | Complexing Agent | Dry Time (sec) | Flux (gfd) | Salt Passage (%) |
|---|---|---|---|---|
| 1 (control) | none | 60 | 11.7 | 0.79 |
| 2 | Tri-methyl phosphate | 60 | 23.3 | 2.7 |
| 3 | Tri-ethyl phosphate | 60 | 13.4 | 0.46 |
| 4 | Tri-butyl phosphate | 60 | 20.3 | 0.88 |

TABLE 2

| Example No. | Complexing Agent | Dry Time (sec) | Flux (gfd) | Salt Passage (%) |
|---|---|---|---|---|
| 5 (control) | none | 60 | 12.1 | 1.2 |
| 6 | Dibutyl phosphite | 60 | 14.4 | 0.62 |

TABLE 3

| Example No. | Complexing Agent | Dry Time (sec) | Flux (gfd) | Salt Passage (%) |
|---|---|---|---|---|
| 7 (control) | none | 10 | 14.7 | 0.7 |
| 8 | Bis(2-ethyl hexyl) phosphite | 10 | 23.7 | 1.06 |

TABLE 4

| Example No. | Complexing Agent | Dry Time (sec) | Flux (gfd) | Salt Passage (%) |
|---|---|---|---|---|
| 9 (control) | none | 10 | 13.7 | 0.69 |
| 10 | Tri phenyl phosphine | 10 | 22.11 | 2.6 |
| 11 | Triethyl phosphate | 10 | 20.5 | 1.5 |

TABLE 5

| Example No. | Complexing Agent | Dry Time (sec) | Flux (gfd) | Salt Passage (%) |
|---|---|---|---|---|
| 12 (control) | none | 10 | 16.6 | 0.26 |
| 13 | Tri phenyl phosphine | 10 | 31.8 | 3.32 |
| 14 | Tri phenyl phosphate | 10 | 22.9 | 0.34 |

TABLE 6

| Example No. | Complexing Agent | Dry Time (sec) | Flux (gfd) | Salt Passage (%) |
|---|---|---|---|---|
| 15 (control) | none | 10 | 12.6 | 0.35 |
| 16 | Tri phenyl phosphine | 10 | 17.7 | 0.41 |
| 17 | Tri butyl phosphate | 10 | 16.2 | 0.53 |

TABLE 7

| Example No. | Complexing Agent | Dry Time (sec) | Flux (gfd) | Salt Passage (%) |
|---|---|---|---|---|
| 18 (control) | none | 10 | 12.0 | 0.38 |
| 19 | Ditertbutyl diisopropyl Phosphoramidite $[(CH_3)_2CH]_2NP[OC(CH_3)_3]_2$ | 10 | 16.0 | 0.45 |

TABLE 8

| Example No. | Complexing Agent | Dry Time (seconds) | Flux (gfd) | Salt Passage (percent) |
|---|---|---|---|---|
| 20 (control) | none | 10 | 13.8 | 0.38 |
| 21 | Dibutylbutyl Phosphonate $CH_3(CH_2)_3P(O)[O(CH_2)_3CH_3]_2$ | 10 | 16.1 | 0.30 |
| 22 | *Tri-octyl phosphine | 10 | 17.5 | 0.39 |

*4:1 stoichiometric ratio of TMC to Tri-octyl phosphine

TABLE 9

| Example No. | Complexing Agent | Dry Time (sec) | Flux (gfd) | Salt Passage (%) |
|---|---|---|---|---|
| 23 (control) | none | 30 | 11.9 | 0.49 |
| 24 | 50 mM Ferrocene | 30 | 14.7 | 0.39 |
| 25 | 100 mM Ferrocene | 30 | 16.5 | 0.37 |

TABLE 10

| Example No. | Complexing Agent | Dry Time (sec) | Flux (gfd) | Salt Passage (%) |
|---|---|---|---|---|
| 26 (control) | none | 10 | 14.2 | 0.341 |
| 27 | 5 mM Triphenyl Bismuth | 10 | 12.8 | 0.341 |

TABLE 11

| Example No. | Complexing Agent | Dry Time (sec) | Flux (gfd) | Salt Passage (%) |
|---|---|---|---|---|
| 28 (Control) | none | 10 | 16.6 | 0.259 |
| 29 | 2.5 mM Triphenyl Phosphine | 10 | 31.8 | 3.32 |
| 30 | 2.5 mM Triphenyl Phosphate | 10 | 22.9 | 0.343 |
| 31 | 2.5 mM Triphenyl Arsine | 10 | 29.9 | 0.498 |
| 32 | 2.5 mM Triphenyl Antimony | 10 | 25.1 | 0.442 |

Tables 10 and 11 highlight differences in preformance associated with various triphenyl metal and nonmetal complexing agents. As shown in Table 10, when used in a system comprising TMC and Isopar L solvent, trioctyl bismuth is not a preferred complexing agent.

TABLE 12

| Example No. | Complexing Agent | Dry Time (sec) | Flux (gfd) | Salt Passage (%) |
|---|---|---|---|---|
| 33 (Control) | None | 10 | 13.7 | 0.30 |
| 34 | 3 mM, Trioctyl Aluminum | 10 | 40.9 | 72 |
| 35 | 5 mM, Tributyl Phosphate | 10 | 19.47 | 0.42 |

Table 12 highlights the difference in performance between a preferred complexing agent for use with TMC and Isopar L solvent (ex. 35) and a complexing agent (ex. 34) which is believed to possess a total energy value above the desired range for the subject invention as evidenced by an unexcepable salt passage.

TABLE 13

| Example No. | Complexing Agent | Drying Time (sec) | Flux (gfd) | Salt Passage (%) |
|---|---|---|---|---|
| 36 (Control) | none | 10 | 19.0 | 0.45 |
| 37 | Fe (III) Tris TMH | 10 | 16.72 | 0.326 |
| 38 | Fe (II) Bis Acac | 10 | 22.8 | 0.65 |
| 39 | Fe (III) Tris Acac | 10 | 24.0 | 0.71 |

TABLE 14

| Example No. | Complexing Agent | Dry Time (sec) | Flux (gfd) | Salt Passage (%) |
|---|---|---|---|---|
| 40 (Control) | none | 10 | 18.3 | 0.48 |
| 41 | Co(III) Tris Acac | 10 | 19.5 | 0.96 |
| 42 | Cr(III) Tris Acac | 10 | 22.0 | 0.50 |

The term "Acac" represents Acetylacetonate (2,4 pentanedione) and "TMH" represents 2,2,6,6 tetramethyl-3,5 heptanedionate. Testing for examples 36–42 was completed at 150 psi and 2000 ppm NaCl. The TMC solution for example 37 was made at a concentration of 2.5 mM of complexing agent; whereas, the TMC solutions for examples 38, 39, 41 and 42 were saturated solutions not containing the remaining undissolved portion. Therefore the solutions used in examples 38, 39, 41, and 42 are of less concentration that 2.5 mM.

As shown in the Tables provided above, the addition of the subject complexing agents to the polyfunctional acyl halide solution can improve flux and/or rejection (e.g., salt passage) of the resulting membranes.

What is claimed is:

1. A method for making a composite membrane comprising interfacially polymerizing a polyfunctional amine with a polyfunctional acyl halide upon a surface of a porous support to form a polyamide layer thereon, the method characterized by the step of contacting a complexing agent with the polyfunctional acyl halide prior to the reaction between the polyfunctional acyl halide and polyfunctional amine, wherein the complexing agent has a solubility parameter of from about 15 to about 26 $J^{1/2}cm^{-3/2}$ and has a binding core selected from non-sulfur atoms selected from Groups IIIA-VIB and Periods 3–6 of the conventional IUPAC period table.

2. The method of claim 1 wherein the step of contacting the complexing agent with the polyfunctional acyl halide results in a polyamide layer having a detectable quantity of the binding core of the complexing agent retained therein after the membrane has been operated in reverse osmosis mode using pure water feed at a 24 gfd flux rate through the membrane with a permeate recovery between 0.5% to 25% at 25° C. for 24 hours.

3. The method of claim 2 wherein the polyamide layer has at least 25 micrograms of the binding core of the complexing agent retained therein per gram of polyamide.

4. The method of claim 1 wherein the change in total energy resulting from the interaction of the polyfunctional acyl halide and complexing agent is between about 3.5 to 20 kcals/mole.

5. The method of claim 4 wherein the complexing agent has a solubility parameter of from 18 to 23 $J^{1/2}cm^{-3/2}$ and wherein the change in total energy resulting from the interaction of the polyfunctional acyl halide and complexing agent is between 5.0 to 15.0 kcals/mole.

6. The method of claim 1 wherein the complexing agent is represented by the formula:

$$\alpha(L_x\beta)_y$$

where $\alpha$ is the binding core, L is a chemical linking group, the same or different, $\beta$ is solubilizing group, the same or different and includes from 1 to 12 carbon atoms, x is an integer from 0 to 1, and y is an integer from 1 to 5.

7. The method of claim 1 wherein the binding core of the complexing agent is a metal.

8. The method of claim 1 wherein the binding core of the complexing agent is selected from silicon and selenium.

9. The method of claim 1 wherein the binding core of the complexing agent is selected from at least one of the following elements: Al, Si, P, As, Sb, Bi, Se, Te, Fe, Cr, Co, Ni, Cu, and Zn.

10. The method of claim 1 wherein the polyfunctional amine is provided as an aqueous solution, the polyfunctional acyl halide is provided as a non-aqueous solution including the complexing agent wherein the complexing agent is substantially soluble in said non-aqueous solution and has a solubility parameter of from about 15 to about 26 $J^{1/2}cm^{-3/2}$, and wherein the solutions are sequentially coated upon a surface of the porous support.

11. The method of claim 1 wherein the complexing agent has a binding core of phosphorous and wherein the complexing agent is selected from at least on of the following classes of compounds: phosphates, phosphites, phosphines, phosphine oxides, phosphonates, diphosphonates, phosphinates, phosphinites, phosphonites, pyrophosphates, pyrophosphoramides, phosphor amides, phosphorothionates, phosphorodithionates, and phosphoroamido thionates.

12. The method of claim 1 wherein the complexing agent comprises a compound represented by the formula:

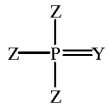

wherein Z is the same or different and is selected from: X, O—P—(X)$_2$, P(O)—X$_2$, (P(—X))$_m$—P—X$_2$, (O—P(—X))$_m$—O—P—X$_2$, (P(O)(—X))$_m$—P(O)—X$_2$, and (O—P(O)—X))$_m$—O—P(O)—X$_2$; P is phosphorous, O is oxygen, m is an integer from 1 to 5; Y is O or a non-bonded pair of electrons, X is the same or different and is selected from: R and R including one or more oxygen and/or alkyl linkage(s), and R is the same or different and is selected from H, and a carbon containing moiety.

13. The method of claim 12 wherein Z is selected from $C_1$–$C_8$ aliphatic groups.

14. The method of claim 12 wherein at least one R is selected from an aromatic group or heterocyclic group.

15. The method of claim 12 wherein Y is oxygen; Z is the same or different and is selected from R and R including one or more oxygen linkages; and R is the same or different and is selected from: H and $C_1$–$C_{12}$ containing moiety.

16. The method of claim 15 wherein R is selected from $C_1$–$C_8$ aliphatic groups.

17. The method of claim 15 wherein at least one R is selected from an aromatic group and/or heterocyclic group.

18. The method of claim 15 wherein the phosphorous containing compound comprises a compound represented by the formula:

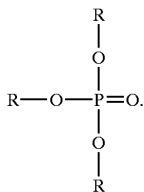

19. The method of claim 18 wherein R is selected from $C_1$–$C_8$ aliphatic groups.

20. The method of claim 18 wherein at least one R is selected from an aromatic and/or heterocyclic group.

21. The method of claim 12 wherein Y is a non-bonded pair of electrons and the phosphorous containing compound comprises a compound represented by the formula:

wherein Z is the same or different and is selected from R and R including one or more oxygen and/or alkyl linkages; and R is the same or different and is selected from: H and $C_1$–$C_{12}$ containing moiety.

22. The method of claim 21 wherein R is selected from $C_1$–$C_8$ aliphatic groups.

23. The method of claim 21 wherein at least one R is selected from an aromatic group.

24. The method of claim 21 wherein at least one R is selected from an heterocyclic group.

25. A method for making a composite membrane comprising the steps of coating a porous support with an aqueous solution containing a polyfunctional amine followed by subsequently coating an organic solution containing a polyfunctional acyl halide such that the polyfunctional amine and polyfunctional acyl halide are contacted with each other and react to form a polyamide layer on the porous support, the method characterized by the step of contacting a complexing agent with the polyfunctional acyl halide prior to the reaction between the polyfunctional acyl halide and polyfunctional amine, wherein the complexing agent has a solubility parameter of from about 15 to about 26 $J^{1/2}cm^{-3/2}$ and has a binding core including at least one atom selected from non-sulfur elements selected from Groups IIIA-VIB and Periods 3–6 of the conventional IUPAC period table.

26. The method of claim 25 wherein the binding core of the complexing agent is selected from at least one of the following elements: Al, Si, P, As, Sb, Se, Te, Fe, Cr, Co, Ni, Cu, Zn and Pb.

* * * * *